US010448115B1

(12) United States Patent
Jamal et al.

(10) Patent No.: US 10,448,115 B1
(45) Date of Patent: Oct. 15, 2019

(54) SPEECH RECOGNITION FOR LOCALIZED CONTENT

(71) Applicant: Amazon Technologies, Inc., Seattle, WA (US)

(72) Inventors: Shah Pavel Jamal, Seattle, WA (US); Mark Lawrence, Bainbridge Island, WA (US); Kyle Daniel Halbach, Seattle, WA (US); Neal Peacock, Bellevue, WA (US); Anderson Kailodge Quach, Seattle, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 0 days.

(21) Appl. No.: 15/278,374

(22) Filed: Sep. 28, 2016

(51) Int. Cl.
*H04N 21/422* (2011.01)
*H04N 21/482* (2011.01)

(52) U.S. Cl.
CPC ... *H04N 21/4828* (2013.01); *H04N 21/42203* (2013.01); *H04N 21/4825* (2013.01)

(58) Field of Classification Search
CPC ......... H04N 21/4622; H04N 21/44204; H04N 21/4828; H04N 21/2187; H04N 21/2343; H04N 21/23439; H04N 21/4755; H04N 21/4826
See application file for complete search history.

(56) References Cited

U.S. PATENT DOCUMENTS

| 5,774,859 | A  | * | 6/1998  | Houser        | H04N 5/44543 348/E5.103 |
|-----------|----|---|---------|---------------|-------------------------|
| 7,793,326 | B2 | * | 9/2010  | McCoskey      | H04N 7/17318 725/53     |
| 8,145,648 | B2 | * | 3/2012  | Kunjithapatham| G06F 17/30781 707/738   |
| 2005/0155052 | A1 | * | 7/2005  | Ostrowska | H04N 5/44543 725/25 |
| 2007/0250901 | A1 | * | 10/2007 | McIntire  | H04N 7/17318 725/146 |
| 2015/0121431 | A1 | * | 4/2015  | Jacoby    | H04N 21/251 725/59 |
| 2017/0093854 | A1 | * | 3/2017  | Nelson    | H04N 1/00 |

* cited by examiner

*Primary Examiner* — Hsiungfei Peng
(74) *Attorney, Agent, or Firm* — Pierce Atwood LLP

(57) ABSTRACT

A system capable of generating and storing program data associated with localized content, such as over-the-air television broadcasts. The system may update a knowledge base with the program data to improve natural language understanding (NLU) processing associated with the localized content. For example, a voice enabled device may receive a voice command and the system may perform NLU processing to interpret the voice command, determine content based on the program data and send an instruction to an output device to output the content. The program data may include information about localized content such as channels detected by the output device and/or content broadcast on the channels, including information about an output device, a channel number, call sign, station name, signal strength, etc. associated with a detected channel, and/or a program name, genre, actors, directors, producers, etc. associated with content broadcast on the channel or stored in a local storage device.

24 Claims, 22 Drawing Sheets

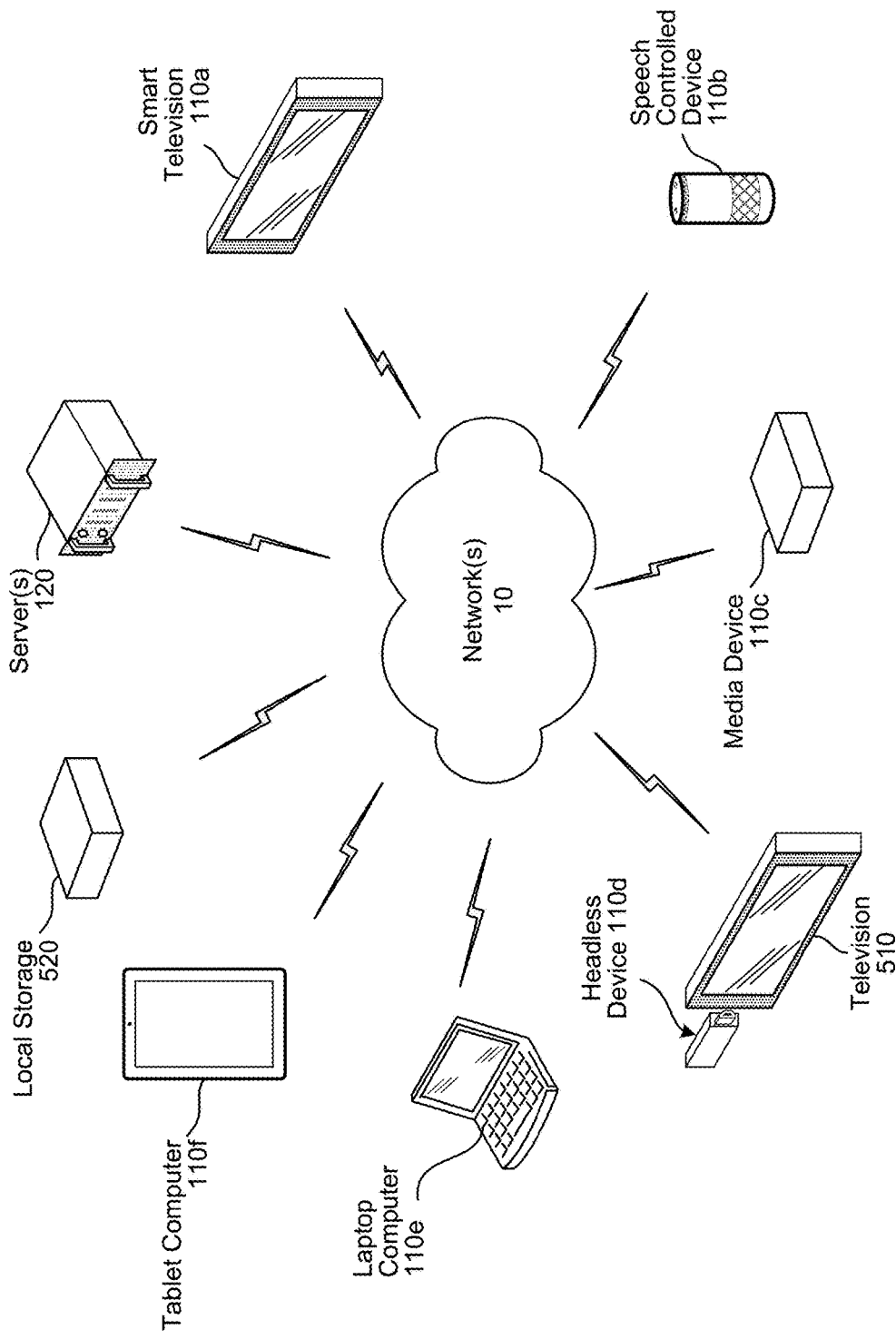

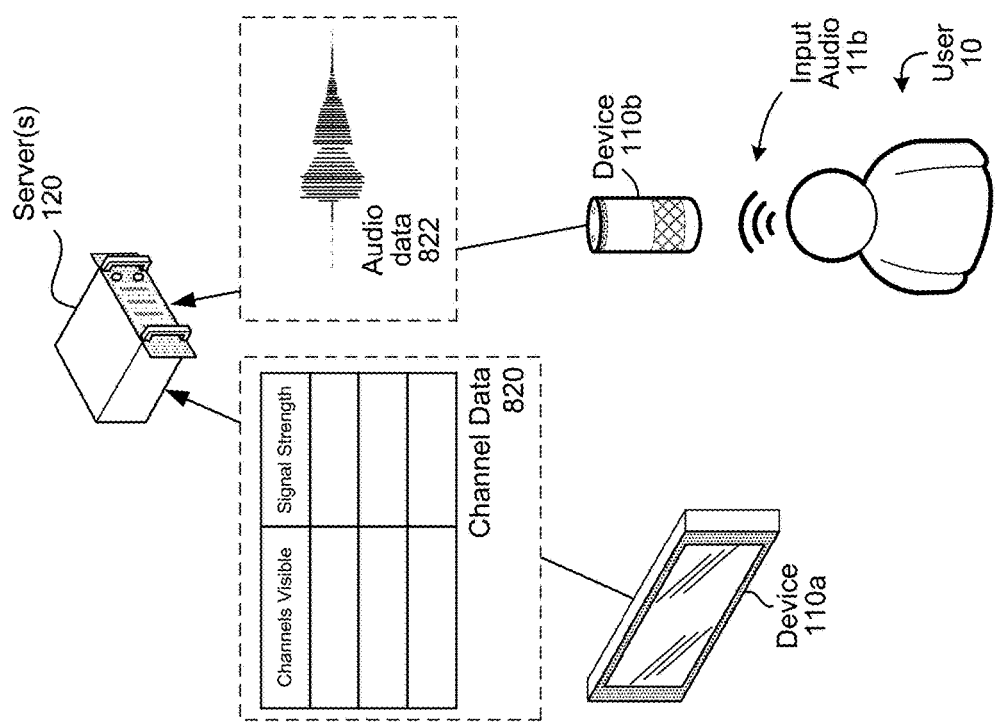
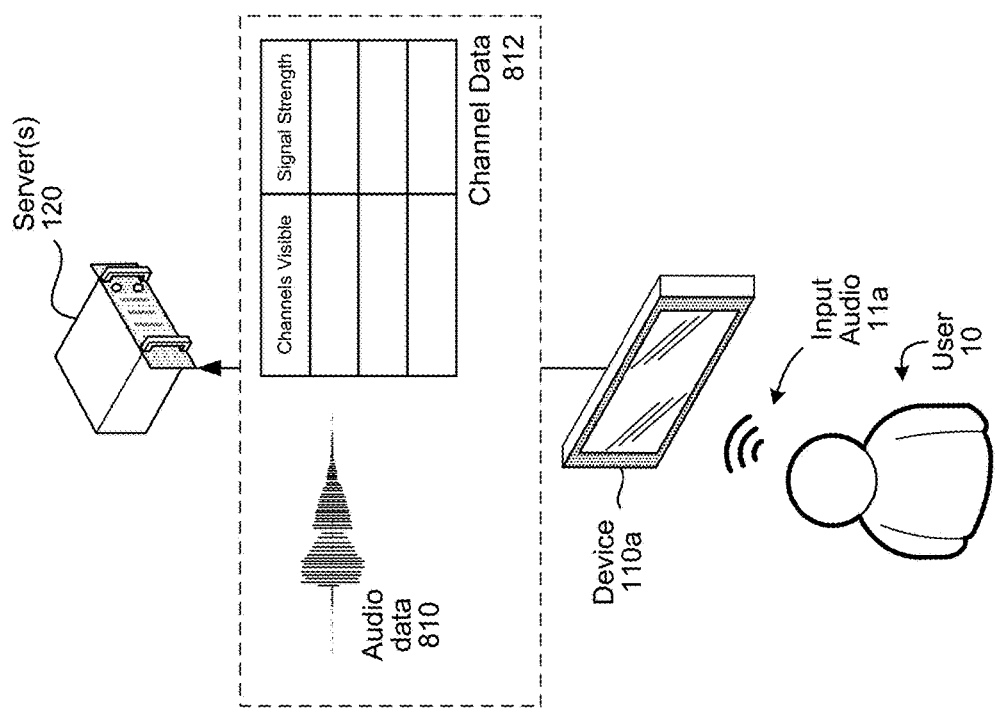

FIG. 9A

| Channels Visible |
|---|
| 006 |
| 008 |
| 010 |

Channel Table 910

| Channels Visible | Signal Strength |
|---|---|
| 006 | -30 dBm |
| 008 | -60 dBm |
| 010 | -40 dBm |

Channel Table 912

FIG. 9B

| Channels Detected | Call Sign | Station Name | Signal Strength | Program Name | Genre | Actors |
|---|---|---|---|---|---|---|
| 006 | WCSHDT | NBC | -30 dBm | Olympics | Sports | |
| 008 | WMTWDT | ABC | -60 dBm | Ellen DeGeneres Show | Talk | Ellen DeGeneres |
| 010 | WCBBDT | PBS | -40 dBm | Charlie Rose | Talk | |

Program Table 920

FIG. 10B

| Device | Channel | Call Sign | Station Name | Signal Strength | Broadcast Time | Program Name | Genre | Actors | Directors | Producers |
|---|---|---|---|---|---|---|---|---|---|---|
| TV1 | 006 | WCSHDT | NBC | -50 dBm | 2:00-4:00 | Olympics | Sports | | | |
| TV1 | 006 | WCSHDT | NBC | -50 dBm | 4:00-5:00 | Olympics | Sports | | | |
| TV1 | 006 | WCSHDT | NBC | -50 dBm | 5:00-5:30 | News at 5 | News | | | |
| TV1 | 008 | WMTWDT | ABC | -40 dBm | 3:00-4:00 | Steve Harvey | Talk | Steve Harvey | | |
| TV1 | 008 | WMTWDT | ABC | -40 dBm | 4:00-5:00 | Ellen DeGeneres | Talk | Ellen DeGeneres | | |
| TV1 | 008 | WMTWDT | ABC | -40 dBm | 5:00-6:00 | News at 5 | News | | | |
| HDD1 | | | | | | The Arrow S3, E5 | Action | Stephen Amell Katie Cassidy | Michael Schultz | Sarah Schechter |
| HDD1 | | | | | | Star Wars: Episode IV | Sci-fi | Mark Hamill Harrison Ford | George Lucas | George Lucas |
| HDD1 | | | | | | Saving Private Ryan | Drama | Tom Hanks Matt Damon | Steven Spielberg | Steven Spielberg |

Program Table 1030

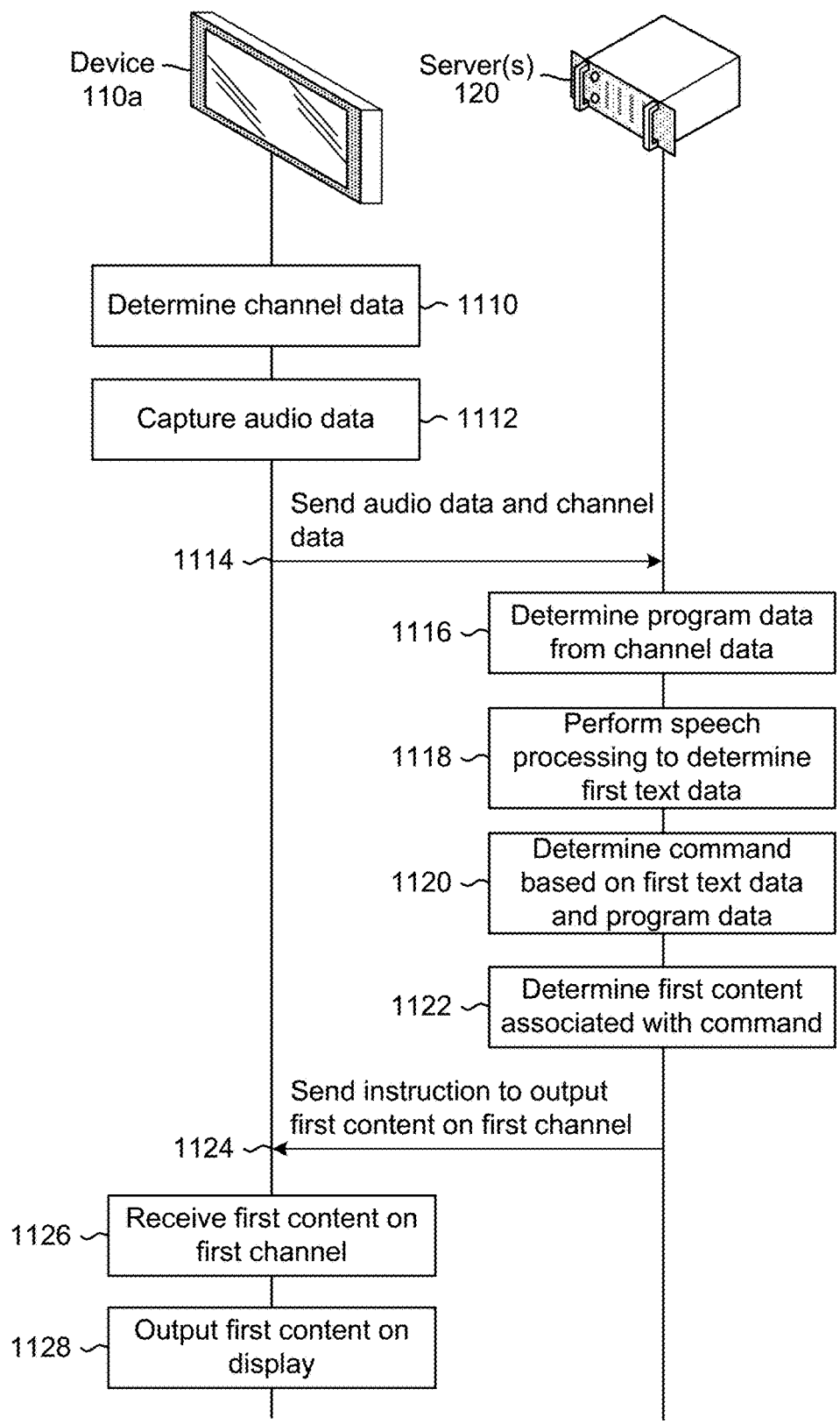

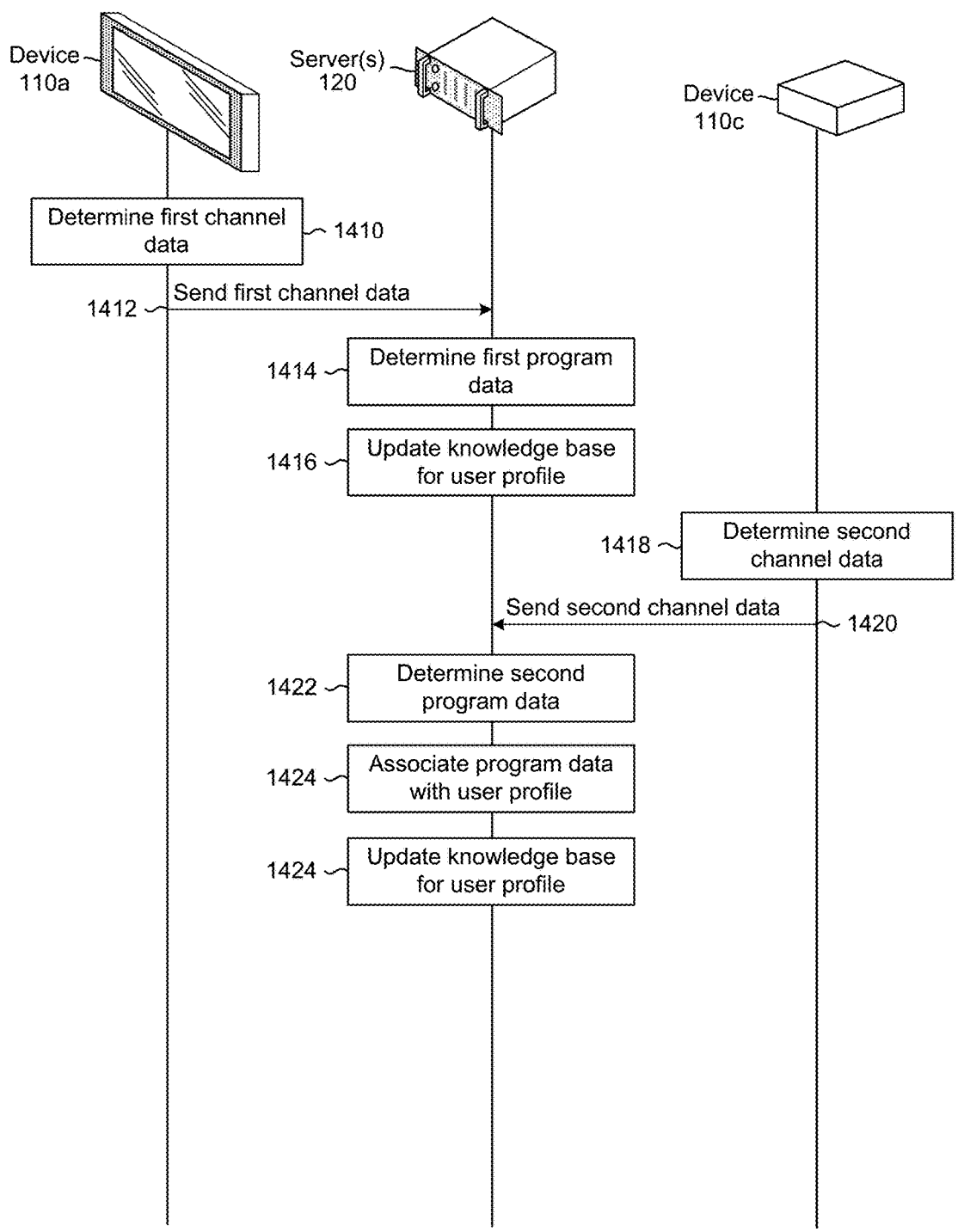

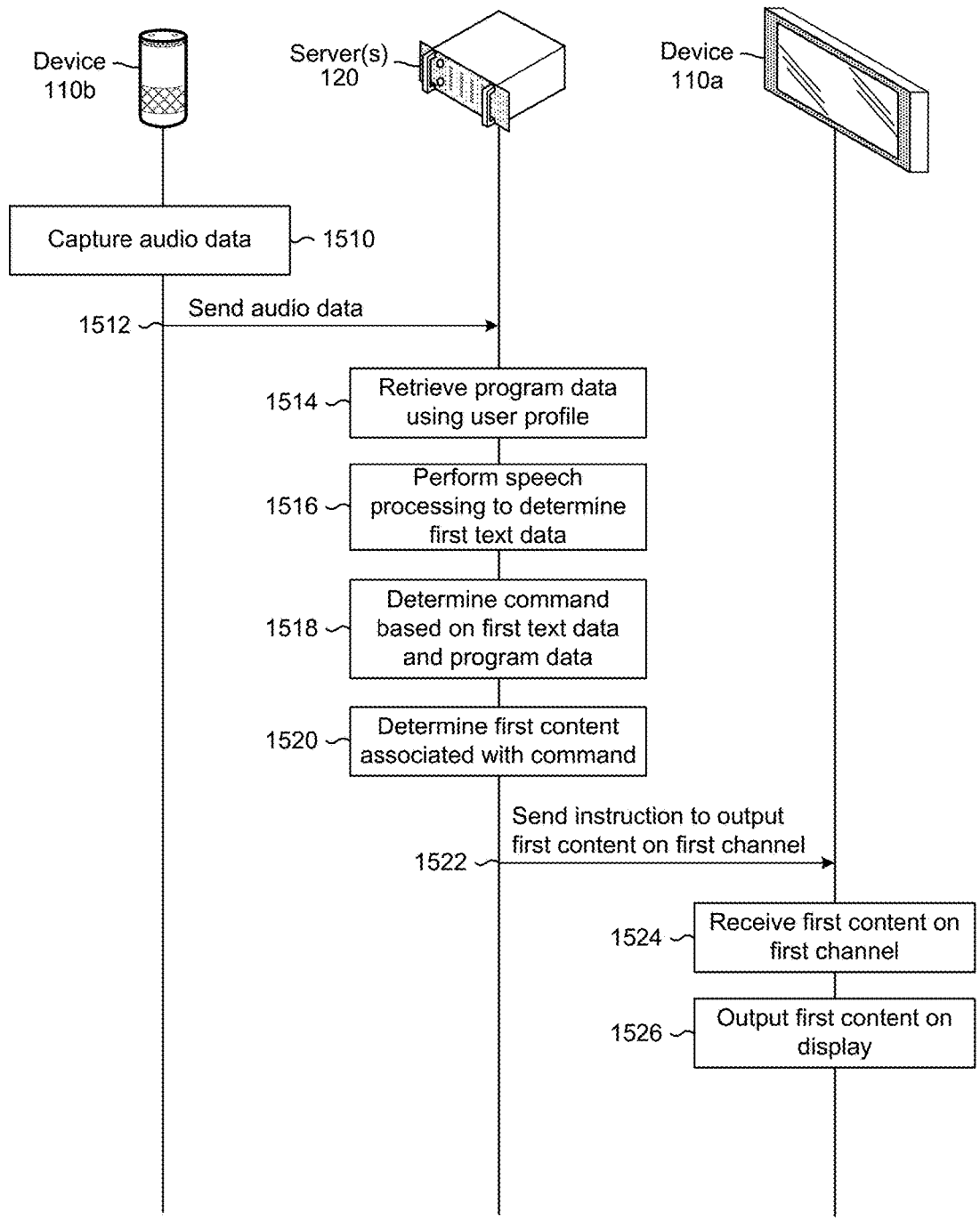

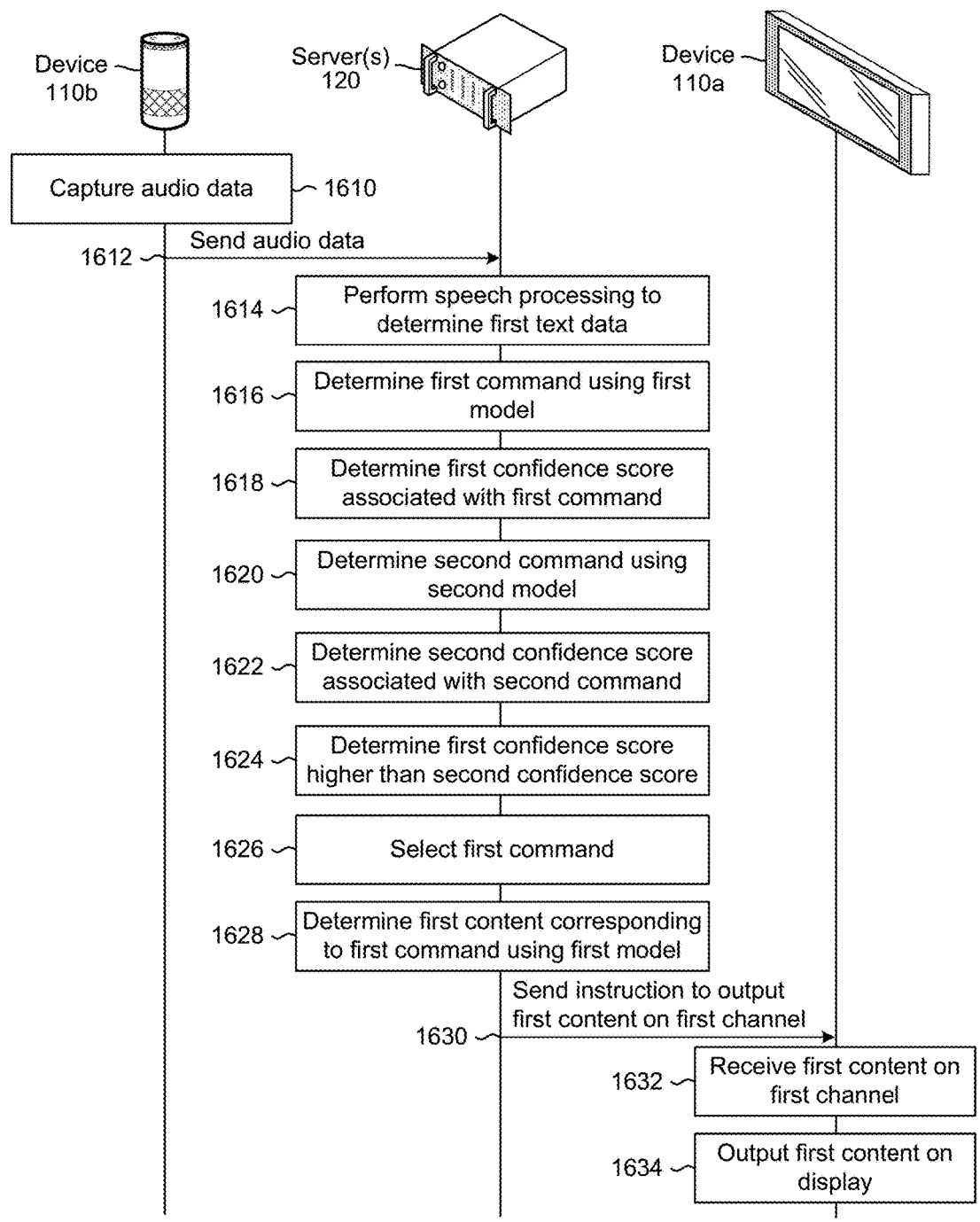

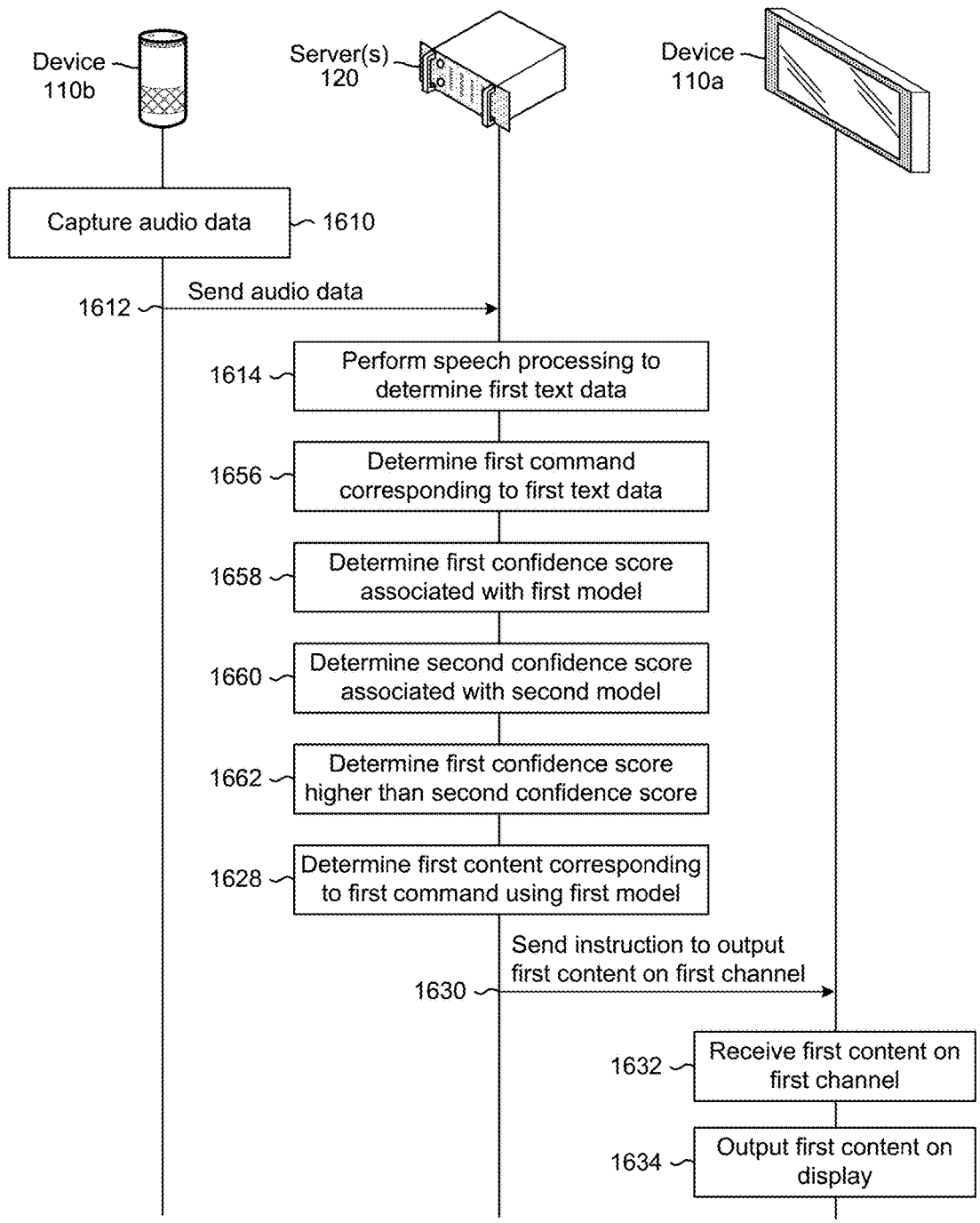

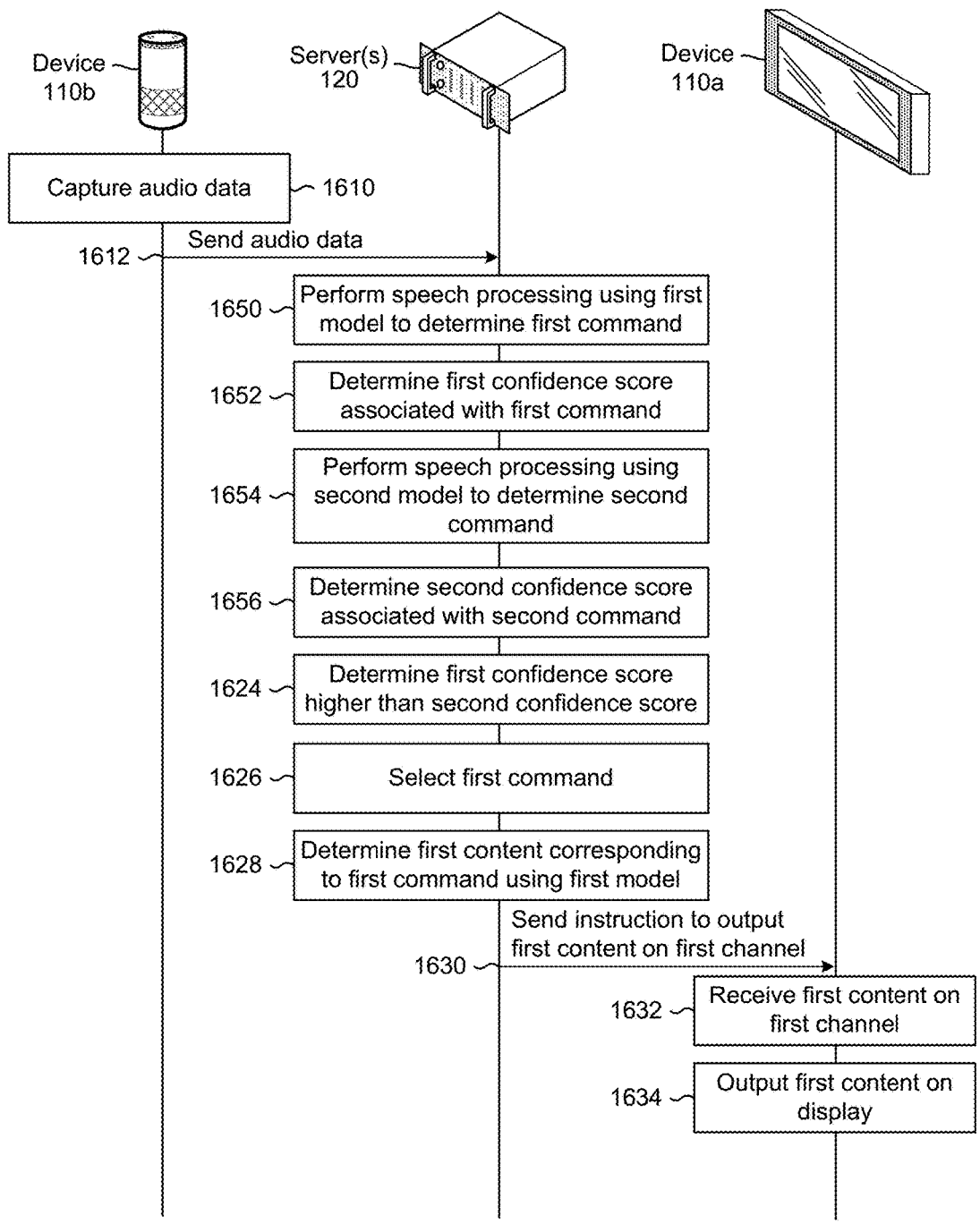

SPEECH RECOGNITION FOR LOCALIZED CONTENT

BACKGROUND

Speech recognition systems have progressed to the point where humans can interact with computing devices by relying on speech. Such systems employ techniques to identify the words spoken by a human user based on the various qualities of a received audio input. Speech recognition combined with natural language understanding processing techniques enable speech-based user control of a computing device to perform tasks based on the user's spoken commands. The combination of speech recognition and natural language understanding processing techniques is referred to herein as speech processing. Speech processing may also convert a user's speech into text data which may then be provided to various text-based software applications.

Speech processing may be used by televisions, media devices, computers, hand-held devices, telephone computer systems, and a wide variety of other devices to improve human-computer interactions. Devices are commonly used to output content. Disclosed herein are technical solutions to improve speech recognition associated with localized content.

BRIEF DESCRIPTION OF DRAWINGS

For a more complete understanding of the present disclosure, reference is now made to the following description taken in conjunction with the accompanying drawings.

FIG. 5 illustrates an example of a computer network for use with the system according to examples of the present disclosure.

FIGS. 8A-8B illustrate examples of receiving audio data and channel data according to embodiments of the present disclosure.

FIGS. 9A-9B illustrate examples of channel tables and a program table according to embodiments of the present disclosure.

FIGS. 10A-10B illustrate an example of associating a channel table with a program guide to generate a program table according to embodiments of the present disclosure.

FIG. 11 is a communication diagram conceptually illustrating an example of interpreting audio data based on program data according to embodiments of the present disclosure.

FIG. 14 is a communication diagram conceptually illustrating an example of generating program data and updating a knowledge base according to embodiments of the present disclosure.

FIG. 15 is a communication diagram conceptually illustrating an example of interpreting audio data based on program data according to embodiments of the present disclosure.

FIGS. 16A-16C are communication diagrams conceptually illustrating examples of determining commands based on program data according to embodiments of the present disclosure.

DETAILED DESCRIPTION

Figure 1:
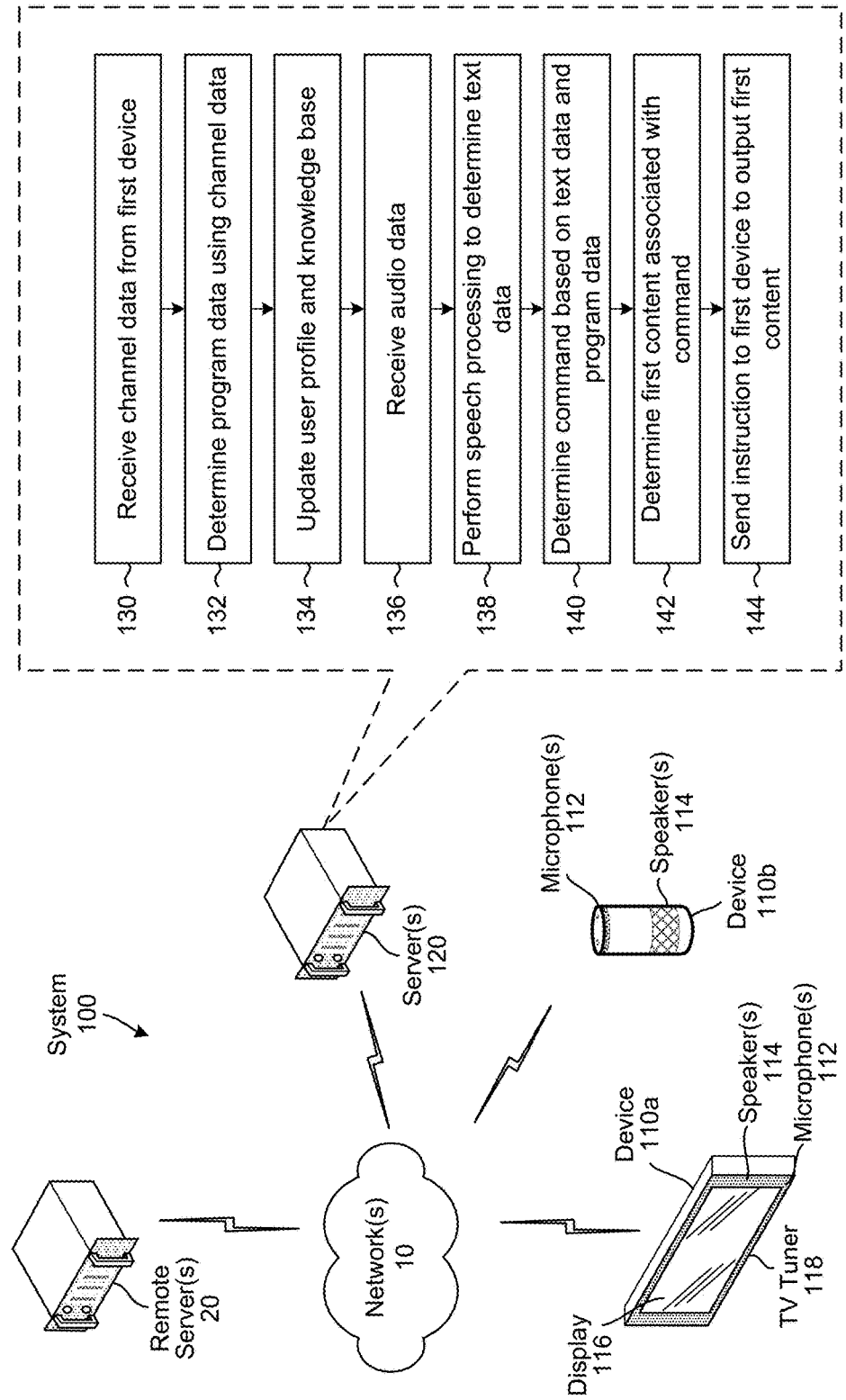
FIG. 1 illustrates a system according to embodiments of the present disclosure.

Automatic speech recognition (ASR) is a field of computer science, artificial intelligence, and linguistics concerned with transforming audio data associated with speech into text data representative of that speech. Similarly, natural language understanding (NLU) is a field of computer science, artificial intelligence, and linguistics concerned with enabling computers to derive meaning from text data input containing natural language. ASR and NLU are often used together as part of a speech processing system.

ASR and NLU can be computationally expensive. That is, significant computing resources may be needed to process ASR and NLU processing within a reasonable time frame. Because of this, a distributed computing environment may be used when performing speech processing. A distributed environment may involve a local device having one or more microphones being configured to capture sounds from a user speaking and convert those sounds into an audio signal. The audio signal/data may then be sent to a downstream remote device for further processing, such as converting the audio signal into an ultimate command. The command may then be executed by a combination of remote and local devices depending on the command itself.

Some commands may be directed to controlling video content displayed on a television or other output device. While some voice controls for televisions may be simple voice commands such as "channel up," "channel down," "volume up" and "volume down," others may require more complex speech processing, such as "tune to the Olympics," "watch the Tonight Show" or the like. While the NLU processing may identify words associated with television channels, content broadcast on the television channels or the like, the number of over-the-air television channels detected may vary from television to television. For example, a television in an upstairs bedroom may detect five channels, while a television in a basement may detect three channels. Therefore, the television channels and the content received by individual devices may vary, such that the NLU processing may not know the content available to an individual device. Further, individual devices may have access to other device-specific content such as recorded programs on a digital video recorder (DVR) or the like.

To improve system performance and speech recognition for localized content, offered is a natural language processing system that generates and stores program data associated with localized content based on the channels and/or content accessible by individual output devices. For example, the system may identify channels detected by an output device (e.g., television, receiver box, etc.) and may generate channel data including information about a detected channel, a Transport Stream Identifier (TSID) (or Transmission Signal Identifier (TSID) for analog signals), call sign, station name, signal strength, etc. associated with the channel, and/or a program name, broadcast time period, genre, actors, etc. associated with content broadcast by the channel and/or stored in the local storage device. Using the channel data, the system may generate program data including information about the channels and/or content broadcast on the channels, including information about an output device, a channel number, TSID, call sign, station name, signal strength, etc. associated with a detected channel, and/or a program name, broadcast time period, genre, actors, directors, producers, etc. associated with content broadcast on the channel or stored in the local storage device.

The system may use the program data to update a knowledge base and/or configure an entity resolution component to improve NLU processing. Therefore, the system may interpret a voice command based on the information included in the program data. For example, when receiving a voice command (e.g., "tune to the Olympics"), the system may identify a command associated with the localized content (e.g., "tune to"), identify first content (e.g., using keywords such as "Olympics") based on the program data and may output the first content (e.g., send an instruction to a television to tune to a channel associated with the Olympics).

FIG. 1 illustrates a high-level conceptual block diagram of a system 100 configured to perform Natural Language Understanding (NLU) processing. Although FIG. 1, and other figures/discussion illustrate the operation of the system in a particular order, the steps described may be performed in a different order (as well as certain steps removed or added) without departing from the intent of the disclosure. As illustrated in FIG. 1, the system 100 may include remote server(s) 20 and server(s) 120 communicatively coupled to device(s) 110 (e.g., a smart television 110a and/or a speech controlled device 110b) via network(s) 10. The device 110 may include microphone(s) 112, speakers 114, a display 116 and/or a TV tuner 118. For example, FIG. 1 illustrates the smart TV 110a including the microphone(s) 112, the speakers 114, the display 116 and the TV tuner 118, while the speech controlled device 110b includes only the microphone(s) 112 and the speakers 114. Using the microphone(s) 112, the device 110 may capture audio data and send the audio data to the server(s) 120 to determine a voice command. For example, the server(s) 120 may perform Automatic Speech Recognition (ASR) processing, Natural Language Understanding (NLU) processing and/or command processing to determine the voice command.

While the examples described herein illustrate the server(s) 120 performing multiple functions, the disclosure is not limited thereto. Instead, the device 110 may perform any of the functions described herein without departing from the disclosure. For example, the server(s) 120 may assist the device 110 with Automatic Speech Recognition (ASR) processing, Natural Language Understanding (NLU) processing, command processing, generating progress data, saving progress data and/or generating synthesized speech. A single server 120 may be capable of performing all speech processing or multiple server(s) 120 may combine to perform the speech processing. In addition, certain speech detection or command execution functions may be performed by device 110. Thus, the device 110 and/or the server(s) 120 may perform the functions described herein without departing from the disclosure.

As used herein, "localized content" may refer to content broadcast by over-the-air television stations and detected by a device 110, content stored on a local storage device (e.g., digital video recorder (DVR) or the like) associated with the device 110, and/or other content that may be accessible to or by a device 110/account/household/user profile. In order to improve speech processing associated with the localized content, the server(s) 120 may receive channel data from the device 110 that indicates channels detected by the device 110, content accessible to the device 110 (e.g., content broadcast by the over-the-air television stations, content stored on the local storage device or the like) and/or information about the channels/content. For ease of explanation, "channel data" may refer to the data sent from the device 110 to the server(s) 120 that indicates any information about localized content, such as the channels, the content accessible to the device 110 and/or information about the channels/content. The device 110 may determine the channel data from the localized content (e.g., metadata received in addition to content) and/or from other sources without departing from the disclosure. For example, the device 110 may receive a programming guide (e.g., program guide data) that corresponds to the localized content being broadcast for a duration of time (e.g., one week).

"Program data" refers to data obtained and stored on the server(s) 120 about the localized content, including the channel data received from the device 110, information about the channel data (e.g., program guide data or other information) obtained from third party sources such as remote server(s) 20, or the like. Thus, the server(s) 120 may receive the channel data and extract corresponding information from a program guide to generate program data associated with the localized content. In some examples, the server(s) 120 may receive program data based on location data (e.g., GPS data, mailing address, etc.) associated with the device 110. For example, the server(s) 120 may identify location data associated with the device 110 along with channel data associated with the localized content and may request program data based on the location data and/or channel data. The location data may be static (e.g., device 110 is located in a residence) and/or dynamic (e.g., device 110 is a mobile device and/or associated with an automobile or the like) without departing from the disclosure, and the location data may be associated with a user profile.

In some examples, the localized content may be video content. Therefore, the channel data may correspond to over-the-air television broadcasts detected by an output device, content stored on a local storage device coupled to the output device or the like and may include information about a detected channel, a Transport Stream Identifier (TSID) (or Transmission Signal Identifier (TSID) for some analog signals), call sign, station name, signal strength, etc. associated with the channel, and/or a program name (e.g., program title, content title, etc.), broadcast time (e.g., broadcast time period), genre, actors, sports leagues, sports teams, players, etc. associated with content broadcast by the channel and/or stored in the local storage device. Using the channel data, the server(s) 120 may generate program data that includes information about an output device, a channel number, TSID, call sign, station name, signal strength, etc. associated with a detected channel, and/or a program name (e.g., program title, content title, etc.), broadcast time (e.g., broadcast time period), genre, actors, directors, producers, sports leagues, sports teams, players, etc. associated with content broadcast on the channel or stored in the local storage device.

In other examples, the output devices may be speakers or other devices capable of outputting audio. Therefore, the channel data may correspond to over-the-air radio broadcasts detected by an output device, content stored on a local storage device coupled to the output device or the like and may include information about a detected channel, a TSID, call sign, station name, signal strength, etc. associated with the channel, and/or a song title, genre, artist name, album name, etc. associated with content broadcast by the channel and/or stored in the local storage device. Using the channel data, the server(s) 120 may generate program data that includes information about an output device, a radio frequency, TSID, call sign, station name, signal strength, etc. associated with a detected channel, and/or a song title, genre, artist name, album name, etc. associated with content broadcast on the channel or stored in the local storage device.

As illustrated in FIG. 1, the server(s) 120 may receive (130) channel data from a first device (e.g., device 110a and/or other devices), may determine (132) program data using the channel data and may update (134) a user profile and/or knowledge base associated with the device 110 using the program data. For example, the channel data may indicate that the device 110 detects Channel 6 and the server(s) 120 may determine that Channel 6 has a station name of NBC, a call sign of WCSHDT, is broadcasting first content (e.g., the Olympics) and a genre of the first content (e.g., Sports). The server(s) 120 may update a knowledge base with the program data, and/or may update some NLU component, such as by configuring a named entity resolution component to include entities such as "NBC," "WCSHDT," "Olympics" and so on. Therefore, the server(s) 120 may improve speech processing associated with the localized content.

The server(s) 120 may receive (136) audio data from the device 110 (e.g., the device 110a, the device 110b and/or other devices), may perform (138) speech processing on the audio data to determine text data and may determine (140) a command based on the text data and the program data (e.g., the updated knowledge base associated with the user profile). The server(s) 120 may determine (142) first content associated with the command and may send (144) an instruction to the first device to output the first content. For example, when receiving audio data including a voice command (e.g., "tune to the Olympics"), the server(s) 120 may identify a command associated with the program data (e.g., "tune to"), determine that the command is associated with the program data, may identify the first content (e.g., using keywords such as "Olympics") and may send an instruction to the device 110 to output the first content (e.g., tune to the Olympics on channel 006).

Figure 2:
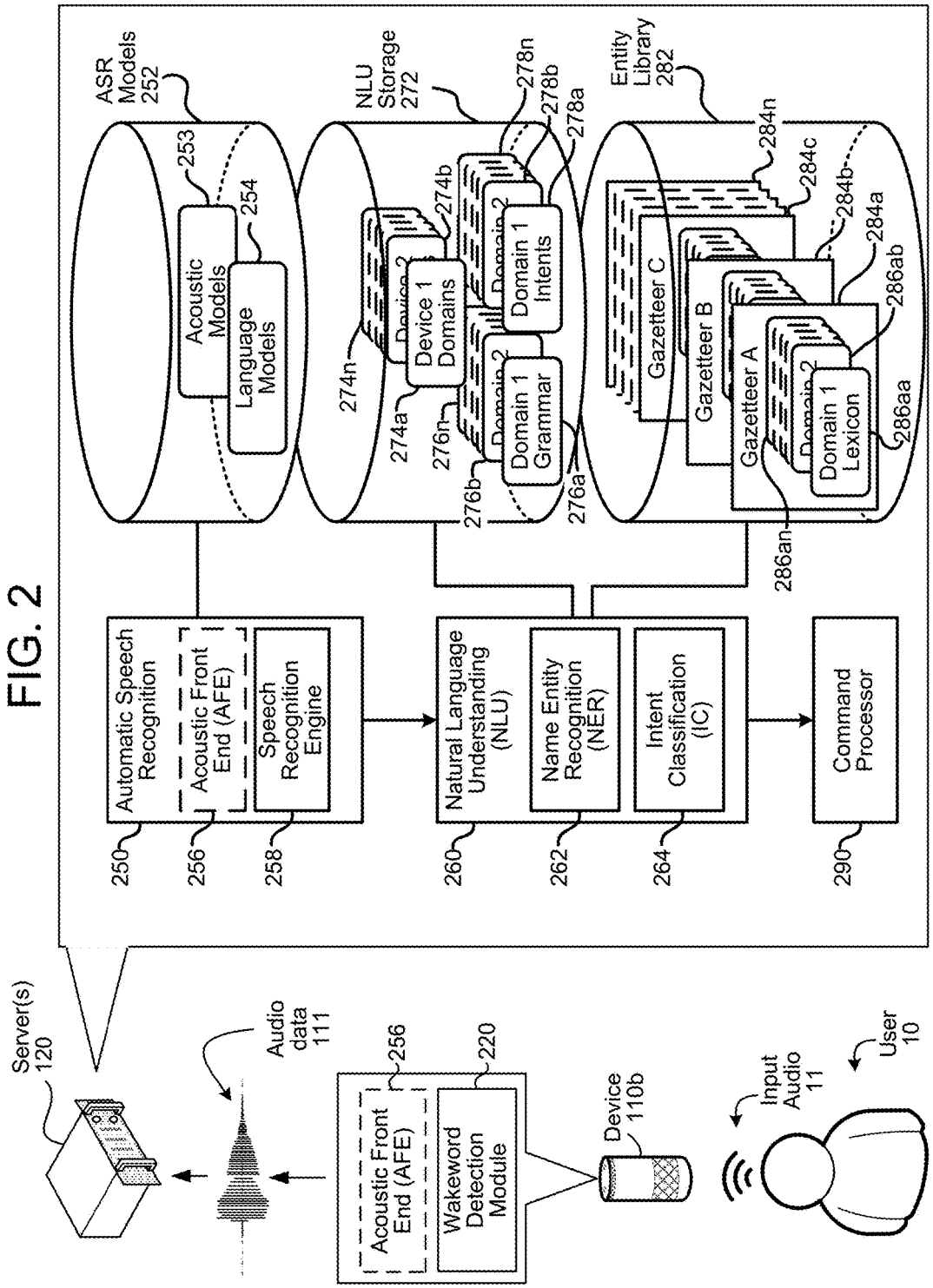
FIG. 2 is a conceptual diagram of how a spoken utterance is processed according to examples of the present disclosure.

The system 100 of FIG. 1 may operate using various speech processing components as described in FIG. 2. FIG. 2 is a conceptual diagram of how a spoken utterance is processed, allowing a system to capture and execute commands spoken by a user, such as spoken commands that may follow a wakeword. The various components illustrated may be located on a same or different physical devices. Communication between various components illustrated in FIG. 2 may occur directly or across network(s) 10. An audio capture component, such as microphone(s) 112 of device 110, captures audio 11 corresponding to a spoken utterance.

The device 110, using a wakeword detection module 220, then processes the audio 11, or audio data 111 corresponding to the audio 11, to determine if a keyword (such as a wakeword) is detected in the audio 11. Following detection of a wakeword, the device sends audio data 111 corresponding to the utterance, to a server(s) 120 that includes an ASR module 250. The audio data 111 may be output from an acoustic front end (AFE) 256 located on the device 110 prior to transmission. Or the audio data 111 may be in a different form for processing by a remote AFE 256.

The wakeword detection module 220 works in conjunction with other components of the device, for example microphone(s) 112 to detect keywords in audio 11. For example, the device 110 may convert audio 11 into audio data 111, and process the audio data 111 with the wakeword detection module 220 to determine whether speech is detected, and if so, if the audio data 111 comprising speech matches an audio signature and/or model corresponding to a particular keyword.

The device 110 may use various techniques to determine whether audio data includes speech. Some embodiments may apply voice activity detection (VAD) techniques. Such techniques may determine whether speech is present in an audio input based on various quantitative aspects of the audio input, such as the spectral slope between one or more frames of the audio input; the energy levels of the audio input in one or more spectral bands; the signal-to-noise ratios of the audio input in one or more spectral bands; or other quantitative aspects. In other embodiments, the device 110 may implement a limited classifier configured to distinguish speech from background noise. The classifier may be implemented by techniques such as linear classifiers, support vector machines, and decision trees. In still other embodiments, Hidden Markov Model (HMM) or Gaussian Mixture Model (GMM) techniques may be applied to compare the audio input to one or more acoustic models in speech storage, which acoustic models may include models corresponding to speech, noise (such as environmental noise or background noise), or silence. Still other techniques may be used to determine whether speech is present in the audio input.

Once speech is detected in the audio 11 received by the device 110 (or separately from speech detection), the device 110 may use the wakeword detection module 220 to perform wakeword detection to determine when a user intends to speak a command to the device 110. This process may also be referred to as keyword detection, with the wakeword being a specific example of a keyword. Specifically, keyword detection is typically performed without performing linguistic analysis, textual analysis or semantic analysis. Instead, incoming audio (or audio data) is analyzed to determine if specific characteristics of the audio match preconfigured acoustic waveforms, audio signatures, or other data to determine if the incoming audio "matches" stored audio data corresponding to a keyword.

Thus, the wakeword detection module 220 may compare audio data 111 to stored models or data to detect a wakeword. One approach for wakeword detection applies general large vocabulary continuous speech recognition (LVCSR) systems to decode the audio signals, with wakeword searching conducted in the resulting lattices or confusion networks. LVCSR decoding may require relatively high computational resources. Another approach for wakeword spotting builds hidden Markov models (HMM) for each key wakeword word and non-wakeword speech signals respectively. The non-wakeword speech includes other spoken words, background noise etc. There can be one or more HMMs built to model the non-wakeword speech characteristics, which are named filler models. Viterbi decoding is used to search the best path in the decoding graph, and the decoding output is further processed to make the decision on keyword presence. This approach can be extended to include discriminative information by incorporating hybrid DNN-HMM decoding framework. In another embodiment the wakeword spotting system may be built on deep neural network (DNN)/recursive neural network (RNN) structures directly, without HMM involved. Such a system may estimate the posteriors of wakewords with context information, either by stacking frames within a context window for DNN, or using RNN. Following-on posterior threshold tuning or smoothing is applied for decision making. Other techniques for wakeword detection, such as those known in the art, may also be used.

Once the wakeword is detected, the local device 110 may "wake" and begin transmitting audio data 111 corresponding to input audio 11 to the server(s) 120 for speech processing. Audio data 111 corresponding to that audio 11 may be sent to a server(s) 120 for routing to a recipient device or may be sent to the server for speech processing for interpretation of the included speech (either for purposes of enabling voice-communications and/or for purposes of executing a command in the speech). The audio data 111 may include data corresponding to the wakeword, or the portion of the audio data 111 corresponding to the wakeword may be removed by the local device 110 prior to sending. Further, a local device 110 may "wake" upon detection of speech/spoken audio above a threshold, as described herein. Upon receipt by the server(s) 120, an ASR module 250 may convert the audio data 111 into text data. The ASR transcribes audio data 111 into text data representing the words of the speech contained in the audio data 111. The text data may then be used by other components for various purposes, such as executing system commands, inputting data, etc. A spoken utterance in the audio data 111 is input to a processor configured to perform ASR which then interprets the utterance based on the similarity between the utterance and pre-established language models 254 stored in an ASR model knowledge base (ASR Models Storage 252). For example, the ASR process may compare the input audio data 111 with models for sounds (e.g., subword units or phonemes) and sequences of sounds to identify words that match the sequence of sounds spoken in the utterance of the audio data 111.

An ASR process 250 converts the audio data 111 into text data. The ASR transcribes audio data 111 into text data representing the words of the speech contained in the audio data 111. The text data may then be used by other components for various purposes, such as executing system commands, inputting data, etc. A spoken utterance in the audio data 111 is input to a processor configured to perform ASR which then interprets the utterance based on the similarity between the utterance and pre-established language models 254 stored in an ASR model knowledge base (ASR Models Storage 252). For example, the ASR process may compare the input audio data 111 with models for sounds (e.g., subword units or phonemes) and sequences of sounds to identify words that match the sequence of sounds spoken in the utterance of the audio data 111.

The different ways a spoken utterance may be interpreted (i.e., the different hypotheses) may each be assigned a probability or a confidence score representing the likelihood that a particular set of words matches those spoken in the utterance. The confidence score may be based on a number of factors including, for example, the similarity of the sound in the utterance to models for language sounds (e.g., an acoustic model 253 stored in an ASR Models Storage 252), and the likelihood that a particular word which matches the sounds would be included in the sentence at the specific location (e.g., using a language or grammar model). Thus each potential textual interpretation of the spoken utterance (hypothesis) is associated with a confidence score. Based on the considered factors and the assigned confidence score, the ASR process 250 outputs the most likely text data recognized in the audio data 111. The ASR process may also output multiple hypotheses in the form of a lattice or an N-best list with each hypothesis corresponding to a confidence score or other score (such as probability scores, etc.).

The device or devices performing the ASR process 250 may include an acoustic front end (AFE) 256 and a speech recognition engine 258. The acoustic front end (AFE) 256 transforms the audio data 111 from the microphone(s) 112 into data for processing by the speech recognition engine 258. The speech recognition engine 258 compares the speech recognition data with acoustic models 253, language models 254, and other data models and information for recognizing the speech conveyed in the audio data 111. The AFE 256 may reduce noise in the audio data 111 and divide the digitized audio data 111 into frames representing time intervals for which the AFE 256 determines a number of values, called features, representing the qualities of the audio data 111, along with a set of those values, called a feature vector or audio feature vector, representing the features/qualities of the audio data 111 within the frame. Many different features may be determined, as known in the art, and each feature represents some quality of the audio 11 that may be useful for ASR processing. A number of approaches may be used by the AFE 256 to process the audio data 111, such as mel-frequency cepstral coefficients (MFCCs), perceptual linear predictive (PLP) techniques, neural network feature vector techniques, linear discriminant analysis, semi-tied covariance matrices, or other approaches known to those of skill in the art.

The speech recognition engine 258 may process the output from the AFE 256 with reference to information stored in speech/model storage 252. Alternatively, post front-end processed data (such as feature vectors) may be received by the device executing ASR processing from another source besides the internal AFE 256. For example, the device 110 may process audio data 111 into feature vectors (for example using an on-device AFE 256) and transmit that information to a server across network(s) 10 for ASR processing. Feature vectors may arrive at the server encoded, in which case they may be decoded prior to processing by the processor executing the speech recognition engine 258.

The speech recognition engine 258 attempts to match received feature vectors to language phonemes and words as known in the stored acoustic models 253 and language models 254. The speech recognition engine 258 computes recognition scores for the feature vectors based on acoustic information and language information. The acoustic information is used to calculate an acoustic score representing a likelihood that the intended sound represented by a group of feature vectors matches a language phoneme. The language information is used to adjust the acoustic score by considering what sounds and/or words are used in context with each other, thereby improving the likelihood that the ASR process will output speech results that make sense grammatically.

The speech recognition engine 258 may use a number of techniques to match feature vectors to phonemes, for example using Hidden Markov Models (HMMs) to determine probabilities that feature vectors may match phonemes. Sounds received may be represented as paths between states of the HMM and multiple paths may represent multiple possible text data matches for the same sound.

Following ASR processing, the ASR results may be sent by the speech recognition engine 258 to other processing components, which may be local to the device performing ASR and/or distributed across the network(s) 10. For example, ASR results in the form of a single textual representation of the speech, an N-best list including multiple hypotheses and respective scores, lattice, etc. may be sent to a server, such as the server(s) 120, for natural language understanding (NLU) processing, such as conversion of the text data into commands for execution, either by the device 110, by the server(s) 120, or by another device (such as a server running a search engine, etc.).

The device performing NLU processing 260 (e.g., server(s) 120) may include various components, including potentially dedicated processor(s), memory, storage, etc. A device configured for NLU processing 260 may include a named entity recognition (NER) module 252, intent classification (IC) module 264, NLU storage 272 and a and knowledge base (not shown). The knowledge base is a database or other information storage that may include information about entities that may be used in resolving user queries. The NLU process may also utilize gazetteer information (284a-284n) stored in entity library storage 282. The knowledge base and/or gazetteer information may be used for entity resolution, for example matching ASR results with different entities (such as song titles, contact names, etc.) Gazetteers may be linked to users (for example a particular gazetteer may be associated with a specific user's music collection), may be linked to certain domains (such as shopping), or may be organized in a variety of other ways.

The NLU process 260 takes textual input (such as text data processed from ASR 250 based on the utterance 11) and attempts to make a semantic interpretation of the text data. That is, the NLU process 260 determines the meaning behind the text data based on the individual words and then implements that meaning. NLU processing 260 interprets a text data string to derive an intent or a desired action from the user as well as the pertinent pieces of information in the text data that allow a device (e.g., device 110) to complete that action. For example, if a spoken utterance is processed using ASR 250 and outputs the text "call mom" the NLU process may determine that the user intended to activate a telephone in his/her device and to initiate a call with a contact matching the entity "mom."

The NLU may process several textual inputs (e.g., text data) related to the same utterance. For example, if the ASR 250 outputs N text segments (as part of an N-best list), the NLU may process all N outputs to obtain NLU results.

As will be discussed further below, the NLU process 260 may be configured to parse and tag to annotate text data as part of NLU processing. For example, for the text "call mom," "call" may be tagged as a command (to execute a phone call) and "mom" may be tagged as a specific entity and target of the command (and the telephone number for the entity corresponding to "mom" stored in a contact list may be included in the annotated result).

To correctly perform NLU processing of speech input, the NLU process 260 may be configured to determine a "domain" of the utterance so as to determine and narrow down which services offered by the endpoint device (e.g., server(s) 120 or device 110) may be relevant. For example, an endpoint device may offer services relating to interactions with a telephone service, a contact list service, a calendar/scheduling service, a music player service, etc. Words in a single text query may implicate more than one service, and some services may be functionally linked (e.g., both a telephone service and a calendar service may utilize data from the contact list).

The name entity recognition module 262 receives a query in the form of ASR results and attempts to identify relevant grammars and lexical information that may be used to construe meaning. To do so, a name entity recognition module 262 may begin by identifying potential domains that may relate to the received query. The NLU storage 272 includes a database of devices (274a-274n) identifying domains associated with specific devices. For example, the device 110 may be associated with domains for music, telephony, calendaring, contact lists, and device-specific communications, but not video. In addition, the entity library may include database entries about specific services on a specific device, either indexed by Device ID, User ID, or Household ID, or some other indicator.

In NLU processing, a domain may represent a discrete set of activities having a common theme, such as "shopping," "music," "calendaring," etc. As such, each domain may be associated with a particular language model and/or grammar database (276a-276n), a particular set of intents/actions (278a-278n), and a particular personalized lexicon (286). Each gazetteer (284a-284n) may include domain-indexed lexical information associated with a particular user and/or device. For example, the Gazetteer A (284a) includes domain-index lexical information 286aa to 286an. A user's music-domain lexical information might include album titles, artist names, and song names, for example, whereas a user's contact-list lexical information might include the names of contacts. Since every user's music collection and contact list is presumably different, this personalized information improves entity resolution.

In some examples, the device 110 may determine contextual information to assist with performing speech processing, such as a domain, based on the process operating when a voice command is received. For example, the device 110 may associate a first domain with a first feature group. When the device 110 receives a voice command while operating a first process corresponding to the first feature group, the device 110 may generate contextual information that indicates the first domain and/or other information and may associate the contextual information with the voice command.

A query may be processed applying the rules, models, and information applicable to each identified domain. For example, if a query potentially implicates both communications and music, the query will be NLU processed using the grammar models and lexical information for communications, and will be processed using the grammar models and lexical information for music. The responses based on the query produced by each set of models is scored (discussed further below), with the overall highest ranked result from all applied domains being ordinarily selected to be the correct result.

An intent classification (IC) module 264 parses the query to determine an intent or intents for each identified domain, where the intent corresponds to the action to be performed that is responsive to the query. Each domain is associated with a database (278a-278n) of words linked to intents. For example, a music intent database may link words and phrases such as "quiet," "volume off," and "mute" to a "mute" intent. The IC module 264 identifies potential intents for each identified domain by comparing words in the query to the words and phrases in the intents database 278.

In order to generate a particular interpreted response, the NER 262 applies the grammar models and lexical information associated with the respective domain. Each grammar model 276 includes the names of entities (i.e., nouns) commonly found in speech about the particular domain (i.e., generic terms), whereas the lexical information 286 from the gazetteer 284 is personalized to the user(s) and/or the device. For instance, a grammar model associated with the shopping domain may include a database of words commonly used when people discuss shopping.

The intents identified by the IC module 264 are linked to domain-specific grammar frameworks (included in 276) with "slots" or "fields" to be filled. For example, if "play music" is an identified intent, a grammar (276) framework or frameworks may correspond to sentence structures such as "Play {Artist Name}," "Play {Album Name}," "Play {Song name}," "Play {Song name} by {Artist Name}," etc. However, to make recognition more flexible, these frameworks would ordinarily not be structured as sentences, but rather based on associating slots with grammatical tags.

For example, the NER module 262 may parse the query to identify words as subject, object, verb, preposition, etc., based on grammar rules and models, prior to recognizing named entities. The identified verb may be used by the IC module 264 to identify intent, which is then used by the NER module 262 to identify frameworks. A framework for an intent of "play" may specify a list of slots/fields applicable to play the identified "object" and any object modifier (e.g., a prepositional phrase), such as {Artist Name}, {Album Name}, {Song name}, etc. The NER module 260 then searches the corresponding fields in the domain-specific and personalized lexicon(s), attempting to match words and phrases in the query tagged as a grammatical object or object modifier with those identified in the database(s).

This process includes semantic tagging, which is the labeling of a word or combination of words according to their type/semantic meaning. Parsing may be performed using heuristic grammar rules, or an NER model may be constructed using techniques such as hidden Markov models, maximum entropy models, log linear models, conditional random fields (CRF), and the like.

For instance, a query of "play mother's little helper by the rolling stones" might be parsed and tagged as {Verb}: "Play," {Object}: "mother's little helper," {Object Preposition}: "by," and {Object Modifier}: "the rolling stones." At this point in the process, "Play" is identified as a verb based on a word database associated with the music domain, which the IC module 264 will determine corresponds to the "play music" intent. No determination has been made as to the meaning of "mother's little helper" and "the rolling stones," but based on grammar rules and models, it is determined that these phrases relate to the grammatical object of the query.

The frameworks linked to the intent are then used to determine what database fields should be searched to determine the meaning of these phrases, such as searching a user's gazette for similarity with the framework slots. So a framework for "play music intent" might indicate to attempt to resolve the identified object based on {Artist Name}, {Album Name}, and {Song name}, and another framework for the same intent might indicate to attempt to resolve the object modifier based on {Artist Name}, and resolve the object based on {Album Name} and {Song Name} linked to the identified {Artist Name}. If the search of the gazetteer does not resolve the slot/field using gazetteer information, the NER module 262 may search the database of generic words associated with the domain (in the NLU's storage 272). For instance, if the query was "play songs by the rolling stones," after failing to determine an album name or song name called "songs" by "the rolling stones," the NER 262 may search the domain vocabulary for the word "songs." In the alternative, generic words may be checked before the gazetteer information, or both may be tried, potentially producing two different results.

The comparison process used by the NER module 262 may classify (i.e., score) how closely a database entry compares to a tagged query word or phrase, how closely the grammatical structure of the query corresponds to the applied grammatical framework, and based on whether the database indicates a relationship between an entry and information identified to fill other slots of the framework.

The NER module 262 may also use contextual operational rules to fill slots. For example, if a user had previously requested to pause a particular song and thereafter requested that the voice-controlled device "please un-pause my music," the NER module 262 may apply an inference-based rule to fill a slot associated with the name of the song that the user currently wishes to play—namely the song that was playing at the time the user requested to pause the music.

The results of NLU processing may be tagged to attribute meaning to the query. So, for instance, "play mother's little helper by the rolling stones" might produce a result of: {domain} Music, {intent} Play Music, {artist name} "rolling stones," {media type} SONG, and {song title} "mother's little helper." As another example, "play songs by the rolling stones" might produce: {domain} Music, {intent} Play Music, {artist name} "rolling stones," and {media type} SONG.

The output from the NLU processing (which may include tagged text data, commands, etc.) may then be sent to a command processor 290, which may be located on a same or separate server(s) 120 as part of the system 100. The destination command processor 290 may be determined based on the NLU output. For example, if the NLU output includes a command to play music, the destination command processor 290 may be a music playing application, such as one located on device 110 or in a music playing appliance, configured to execute a music playing command. If the NLU output includes a search query (for example, requesting the return of search results), the destination command processor 290 may include a search engine processor, such as one located on a search server, configured to execute a search command and determine search results, which may include output text data to be processed by a TTS engine and output from a device as synthesized speech, such as announcements made with the pages described above.

Figure 3:
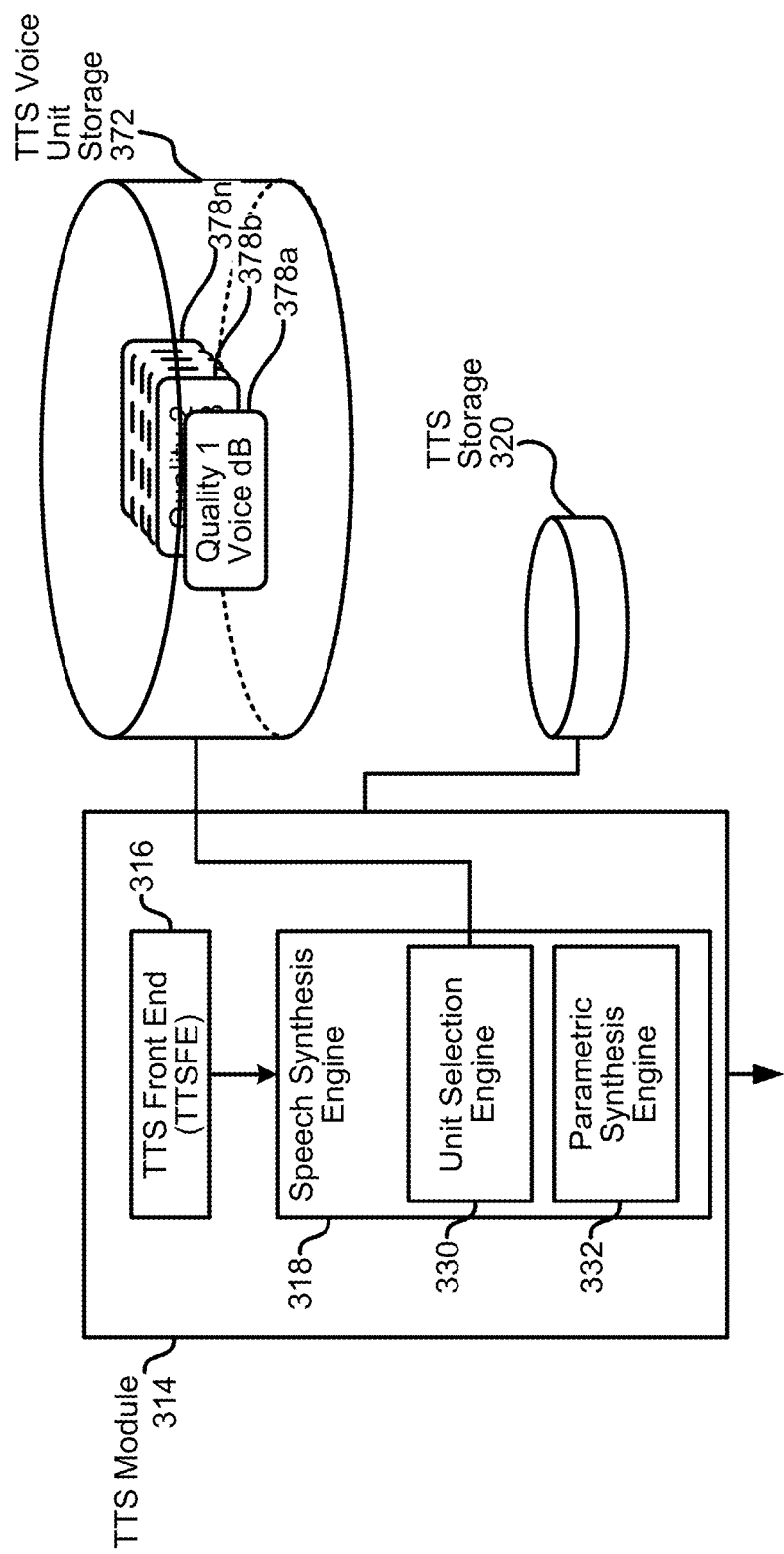
FIG. 3 illustrates an example of generating text-to-speech (TTS) or synthesized speech according to examples of the present disclosure.

FIG. 3 illustrates an example of generating text-to-speech (TTS) or synthesized speech according to examples of the present disclosure. The TTS module/processor 314 includes a TTS front end (TTSFE) 316, a speech synthesis engine 318, and TTS storage 320. The TTSFE 316 transforms input text data (for example from command processor 290) into a symbolic linguistic representation for processing by the speech synthesis engine 318. The TTSFE 316 may also process tags or other data input to the TTS module that indicate how specific words should be pronounced (e.g., an indication that a word is an interjection). The speech synthesis engine 318 compares the annotated phonetic units models and information stored in the TTS storage 320 for converting the input text data into speech. The TTSFE 316 and speech synthesis engine 318 may include their own controller(s)/processor(s) and memory or they may use the controller/processor and memory 310 of the server(s) 120, device 110, or other device, for example. Similarly, the instructions for operating the TTSFE 316 and speech synthesis engine 318 may be located within the TTS module 314, within the memory and/or storage of the server(s) 120, device 110, or within an external device.

Text data input into a TTS module 314 may be sent to the TTSFE 316 for processing. The front-end may include modules for performing text normalization, linguistic analysis, and linguistic prosody generation. During text normalization, the TTSFE processes the text data input and generates standard text data, converting such things as numbers, abbreviations (such as Apt., St., etc.), symbols ($, %, etc.) into the equivalent of written out words.

During linguistic analysis the TTSFE 316 analyzes the language in the normalized text data to generate a sequence of phonetic units corresponding to the input text data. This process may be referred to as phonetic transcription. Phonetic units include symbolic representations of sound units to be eventually combined and output by the system as speech. Various sound units may be used for dividing text data for purposes of speech synthesis. A TTS module 314 may process speech based on phonemes (individual sounds), half-phonemes, di-phones (the last half of one phoneme coupled with the first half of the adjacent phoneme), bi-phones (two consecutive phonemes), syllables, words, phrases, sentences, or other units. Each word may be mapped to one or more phonetic units. Such mapping may be performed using a language dictionary stored by the system, for example in the TTS storage module 320. The linguistic analysis performed by the TTSFE 316 may also identify different grammatical components such as prefixes, suffixes, phrases, punctuation, syntactic boundaries, or the like. Such grammatical components may be used by the TTS module 314 to craft a natural sounding audio waveform output. The language dictionary may also include letter-to-sound rules and other tools that may be used to pronounce previously unidentified words or letter combinations that may be encountered by the TTS module 314. Generally, the more information included in the language dictionary, the higher quality the speech output.

Based on the linguistic analysis the TTSFE 316 may then perform linguistic prosody generation where the phonetic units are annotated with desired prosodic characteristics, also called acoustic features, which indicate how the desired phonetic units are to be pronounced in the eventual output speech. During this stage the TTSFE 316 may consider and incorporate any prosodic annotations that accompanied the text data input to the TTS module 314. Such acoustic features may include pitch, energy, duration, and the like. Application of acoustic features may be based on prosodic models available to the TTS module 314. Such prosodic models indicate how specific phonetic units are to be pronounced in certain circumstances. A prosodic model may consider, for example, a phoneme's position in a syllable, a syllable's position in a word, a word's position in a sentence or phrase, neighboring phonetic units, etc. As with the language dictionary, prosodic model with more information may result in higher quality speech output than prosodic models with less information. Further, a prosodic model and/or phonetic units may be used to indicate particular speech qualities of the speech to be synthesized, where those speech qualities may match the speech qualities of input speech (for example, the phonetic units may indicate prosodic characteristics to make the ultimately synthesized speech sound like a whisper based on the input speech being whispered).

The output of the TTSFE 316, referred to as a symbolic linguistic representation, may include a sequence of phonetic units annotated with prosodic characteristics. This symbolic linguistic representation may be sent to a speech synthesis engine 318, also known as a synthesizer, for conversion into an audio waveform of speech for output to an audio output device and eventually to a user. The speech synthesis engine 318 may be configured to convert the input text data into high-quality natural-sounding speech in an efficient manner. Such high-quality speech may be configured to sound as much like a human speaker as possible, or may be configured to be understandable to a listener without attempts to mimic a precise human voice.

A speech synthesis engine 318 may perform speech synthesis using one or more different methods. In one method of synthesis called unit selection, described further below, a unit selection engine 330 matches the symbolic linguistic representation created by the TTSFE 316 against a database of recorded speech, such as a database of a voice corpus. The unit selection engine 330 matches the symbolic linguistic representation against spoken audio units in the database. Matching units are selected and concatenated together to form a speech output. Each unit includes an audio waveform corresponding with a phonetic unit, such as a short .wav file of the specific sound, along with a description of the various acoustic features associated with the .wav file (such as its pitch, energy, etc.), as well as other information, such as where the phonetic unit appears in a word, sentence, or phrase, the neighboring phonetic units, etc. Using all the information in the unit database, a unit selection engine 330 may match units to the input text data to create a natural sounding waveform. The unit database may include multiple examples of phonetic units to provide the system with many different options for concatenating units into speech. One benefit of unit selection is that, depending on the size of the database, a natural sounding speech output may be generated. As described above, the larger the unit database of the voice corpus, the more likely the system will be able to construct natural sounding speech.

In another method of synthesis called parametric synthesis parameters such as frequency, volume, noise, are varied by a parametric synthesis engine 332, digital signal processor or other audio generation device to create an artificial speech waveform output. Parametric synthesis uses a computerized voice generator, sometimes called a vocoder. Parametric synthesis may use an acoustic model and various statistical techniques to match a symbolic linguistic representation with desired output speech parameters. Parametric synthesis may include the ability to be accurate at high processing speeds, as well as the ability to process speech without large databases associated with unit selection, but also typically produces an output speech quality that may not match that of unit selection. Unit selection and parametric techniques may be performed individually or combined together and/or combined with other synthesis techniques to produce speech audio output.

Parametric speech synthesis may be performed as follows. A TTS module 314 may include an acoustic model, or other models, which may convert a symbolic linguistic representation into a synthetic acoustic waveform of the text data input based on audio signal manipulation. The acoustic model includes rules which may be used by the parametric synthesis engine 332 to assign specific audio waveform parameters to input phonetic units and/or prosodic annotations. The rules may be used to calculate a score representing a likelihood that a particular audio output parameter(s) (such as frequency, volume, etc.) corresponds to the portion of the input symbolic linguistic representation from the TTSFE 316.

The parametric synthesis engine 332 may use a number of techniques to match speech to be synthesized with input phonetic units and/or prosodic annotations. One common technique is using Hidden Markov Models (HMMs). HMMs may be used to determine probabilities that audio output should match textual input (e.g., text data). HMMs may be used to translate from parameters from the linguistic and acoustic space to the parameters to be used by a vocoder (the digital voice encoder) to artificially synthesize the desired speech. Using HMMs, a number of states are presented, in which the states together represent one or more potential acoustic parameters to be output to the vocoder and each state is associated with a model, such as a Gaussian mixture model. Transitions between states may also have an associated probability, representing a likelihood that a current state may be reached from a previous state. Sounds to be output may be represented as paths between states of the HMM and multiple paths may represent multiple possible audio matches for the same input text data. Each portion of text data may be represented by multiple potential states corresponding to different known pronunciations of phonemes and their parts (such as the phoneme identity, stress, accent, position, etc.). An initial determination of a probability of a potential phoneme may be associated with one state. As new text data is processed by the speech synthesis engine 318, the state may change or stay the same, based on the processing of the new text data. For example, the pronunciation of a previously processed word might change based on later processed words. A Viterbi algorithm may be used to find the most likely sequence of states based on the processed text data. The HMMs may generate speech in parametrized form including parameters such as fundamental frequency (f0), noise envelope, spectral envelope, etc. that are translated by a vocoder into audio segments. The output parameters may be configured for particular vocoders such as a STRAIGHT vocoder, TANDEM-STRAIGHT vocoder, HNM (harmonic plus noise) based vocoders, CELP (code-excited linear prediction) vocoders, GlottHMM vocoders, HSM (harmonic/stochastic model) vocoders, or others.

Unit selection speech synthesis may be performed as follows. Unit selection includes a two-step process. First a unit selection engine 330 determines what speech units to use and then it combines them so that the particular combined units match the desired phonemes and acoustic features and create the desired speech output. Units may be selected based on a cost function which represents how well particular units fit the speech segments to be synthesized. The cost function may represent a combination of different costs representing different aspects of how well a particular speech unit may work for a particular speech segment. For example, a target cost indicates how well a given speech unit matches the features of a desired speech output (e.g., pitch, prosody, etc.). A join cost represents how well a speech unit matches a consecutive speech unit for purposes of concatenating the speech units together in the eventual synthesized speech. The overall cost function is a combination of target cost, join cost, and other costs that may be determined by the unit selection engine 330. As part of unit selection, the unit selection engine 330 chooses the speech unit with the lowest overall combined cost. For example, a speech unit with a very low target cost may not necessarily be selected if its join cost is high.

The system may be configured with one or more voice corpuses for unit selection. Each voice corpus may include a speech unit database. The speech unit database may be stored in TTS storage 320, in storage 312, or in another storage component. For example, different unit selection databases may be stored in TTS voice unit storage 372. Each speech unit database includes recorded speech utterances with the utterances' corresponding text data aligned to the utterances. A speech unit database may include many hours of recorded speech (in the form of audio waveforms, feature vectors, or other formats), which may occupy a significant amount of storage. The unit samples in the speech unit database may be classified in a variety of ways including by phonetic unit (phoneme, diphone, word, etc.), linguistic prosodic label, acoustic feature sequence, speaker identity, etc. The sample utterances may be used to create mathematical models corresponding to desired audio output for particular speech units. When matching a symbolic linguistic representation the speech synthesis engine 318 may attempt to select a unit in the speech unit database that most closely matches the input text data (including both phonetic units and prosodic annotations). Generally the larger the voice corpus/speech unit database the better the speech synthesis may be achieved by virtue of the greater number of unit samples that may be selected to form the precise desired speech output.

Audio waveforms including the speech output from the TTS module 314 may be sent to an audio output component, such as a speaker for playback to a user or may be sent for transmission to another device, such as another server(s) 120, for further processing or output to a user. Audio waveforms including the speech may be sent in a number of different formats such as a series of feature vectors, uncompressed audio data, or compressed audio data. For example, audio speech output may be encoded and/or compressed by an encoder/decoder (not shown) prior to transmission. The encoder/decoder may be customized for encoding and decoding speech data, such as digitized audio data, feature vectors, etc. The encoder/decoder may also encode non-TTS data of the system, for example using a general encoding scheme such as .zip, etc.

A TTS module 314 may be configured to perform TTS processing in multiple languages. For each language, the TTS module 314 may include specially configured data, instructions and/or components to synthesize speech in the desired language(s). To improve performance, the TTS module 314 may revise/update the contents of the TTS storage 320 based on feedback of the results of TTS processing, thus enabling the TTS module 314 to improve speech recognition.

Other information may also be stored in the TTS storage 320 for use in speech recognition. The contents of the TTS storage 320 may be prepared for general TTS use or may be customized to include sounds and words that are likely to be used in a particular application. For example, for TTS processing by a global positioning system (GPS) device, the TTS storage 320 may include customized speech specific to location and navigation. In certain instances the TTS storage 320 may be customized for an individual user based on his/her individualized desired speech output. For example a user may prefer a speech output voice to be a specific gender, have a specific accent, speak at a specific speed, have a distinct emotive quality (e.g., a happy voice), or other customizable characteristic(s) (such as speaking an interjection in an enthusiastic manner) as explained in other sections herein. The speech synthesis engine 318 may include specialized databases or models to account for such user preferences.

For example, to create the customized speech output of the system, the system may be configured with multiple voice corpuses/unit databases 378a-378n, where each unit database is configured with a different "voice" to match desired speech qualities. The voice selected by the TTS module 314 to synthesize the speech. For example, one voice corpus may be stored to be used to synthesize whispered speech (or speech approximating whispered speech), another may be stored to be used to synthesize excited speech (or speech approximating excited speech), and so on. To create the different voice corpuses a multitude of TTS training utterance may be spoken by an individual and recorded by the system. The TTS training utterances used to train a TTS voice corpus may be different from the training utterances used to train an ASR system or the models used by the speech quality detector. The audio associated with the TTS training utterances may then be split into small audio segments and stored as part of a voice corpus. The individual speaking the TTS training utterances may speak in different voice qualities to create the customized voice corpuses, for example the individual may whisper the training utterances, say them in an excited voice, and so on. Thus the audio of each customized voice corpus may match the respective desired speech quality. The customized voice corpuses 378 may then be used during runtime to perform unit selection to synthesize speech having a speech quality corresponding to the input speech quality.

Figure 4:
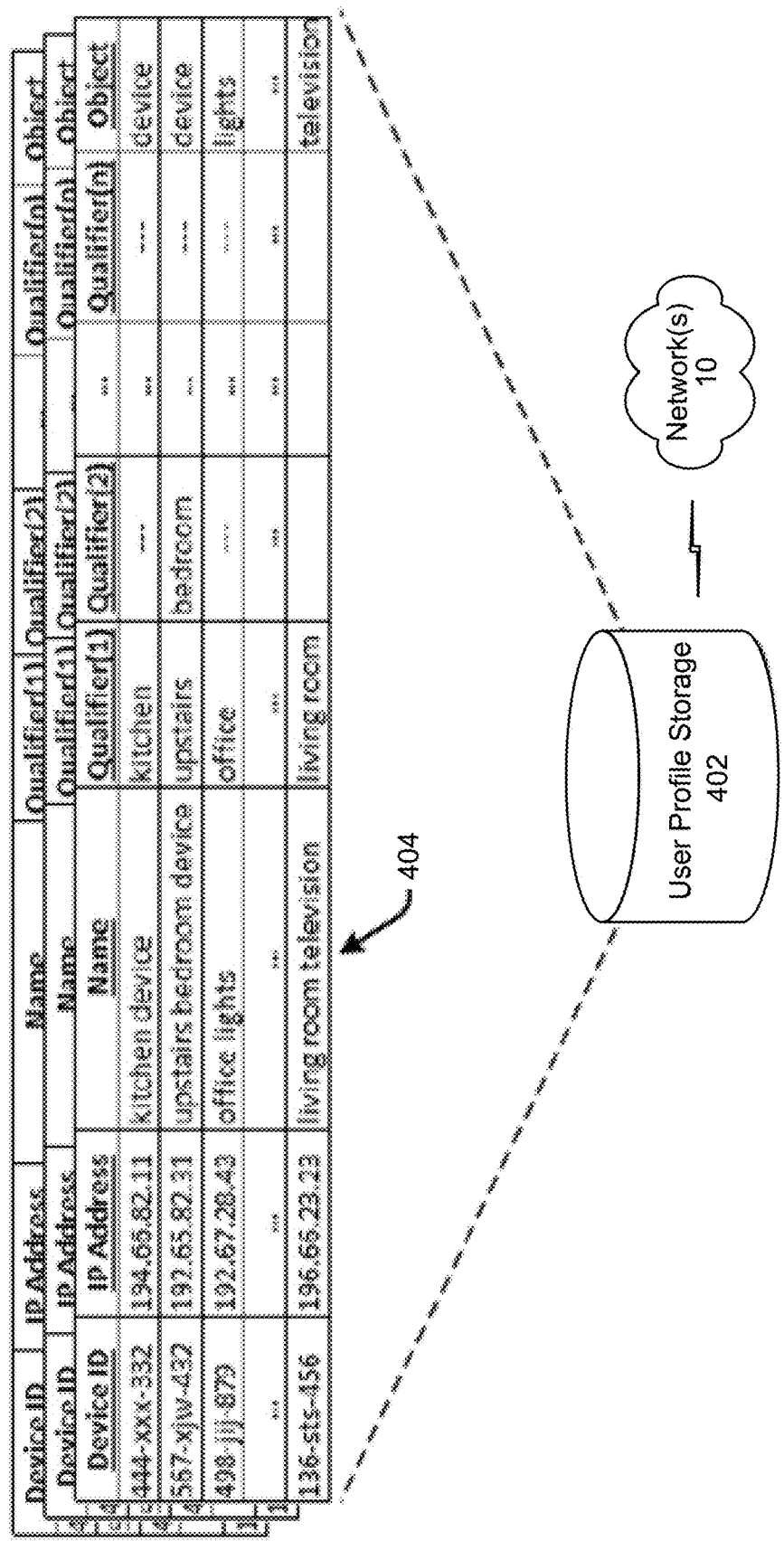
FIG. 4 illustrates data stored and associated with user profiles according to embodiments of the present disclosure.

The server(s) 120 may include or refer to data regarding user accounts, shown by the user profile storage 402 illustrated in FIG. 4. The user profile storage 402 may be located proximate to server(s) 120, or may otherwise be in communication with various components, for example over network(s) 10. The user profile storage 402 may include a variety of information related to individual users, households, accounts, etc. that interact with the system 100. For illustration, as shown in FIG. 4, the user profile storage 402 may include data regarding the devices associated with particular individual user accounts 404. In an example, the user profile storage 402 is a cloud-based storage. Such data may include device identifier (ID) and internet protocol (IP) address information for different devices as well as names by which the devices may be referred to by a user. Further qualifiers describing the devices may also be listed along with a description of the type of object of the device.

Further, the user account 404 may include or be associated with channel data (e.g., a channel table) and/or program data (e.g., a program table), as discussed in greater detail below with regard to FIGS. 10A-10B. Thus, while the disclosure describes examples of associating program data with a single device 110, the disclosure is not limited thereto and the program data may be associated with individual users, households, accounts, etc. without departing from the disclosure. For example, the server(s) 120 may receive audio data and channel data from a single device (e.g., smart TV 110a), determine program data associated with the channel data, determine a command associated with the audio data based on the program data and send an instruction to the device to output content based on the command. Additionally or alternatively, the server(s) 120 may receive channel data from a first device (e.g., smart TV 110a) and may determine program data associated with the channel data. The server(s) 120 may then receive audio data from a second device (e.g., speech controlled device 110b), determine that the audio data is associated with the first device, determine a command associated with the audio data based on the program data and send an instruction to the first device to output content based on the command.

In some examples, devices may be associated (e.g., linked, paired, etc.) and the association stored in the user profile. For example, a first device (e.g., speech controlled device 110b) may be associated with a second device (e.g., smart television 110a), such that the server(s) 120 receive audio data from the first device and send instructions to the second device to output content. Additionally or alternatively, a source device (e.g., media device 110c) may be associated with an output device (e.g., headless device 110d), such that the server(s) 120 may send an instruction to the source device to transmit content to the output device. The server(s) 120 may interpret voice commands based on the associations and/or may determine associations based on the voice commands and the fact that the devices are associated with the user profile.

As illustrated in FIG. 5, devices 110 may contain components of the system 100 and may be connected over network(s) 10. The network(s) 10 may be a local or private network or may be part of a wider network. For example, the network(s) 10 may include a wired local area network (LAN), a wireless local area network (WLAN) (such as WiFi), Bluetooth, and/or wireless network, such as a Long Term Evolution (LTE) network, WiMAX network, 3G network, etc.

Devices 110 may be connected to the network(s) 10 through either wired or wireless connections. For example, a smart television 110a, a speech controlled device 110b, a media device 110c, a headless device 110d connected to a television 510, a laptop computer 110e, a tablet computer 110f and/or local storage 520, may be connected to the network(s) 10 through a wired and/or wireless connection. Thus, while the examples illustrated above are directed to the smart television 110a, the disclosure is not limited thereto and the device 110 may be any device capable of receiving and/or outputting content to a user.

While FIG. 5 illustrates the local storage 520 connected to the devices 110 via the network(s) 10, the disclosure is not limited thereto and the local storage 520 may be wired and/or wireless connected to one or more devices 110 without being connected to the network(s) 10. For example, the local storage 520 may be wired to the smart television 110a, such that the smart television 110a may output content from the local storage 520 that is unavailable to the other devices 110 in the system 100.

While the examples described herein illustrate the device 110 performing multiple functions, the disclosure is not limited thereto. Instead, the server(s) 120 may perform any of the functions described herein without departing from the disclosure. For example, the server(s) 120 may assist the device 110 with Automatic Speech Recognition (ASR) processing, Natural Language Understanding (NLU) processing, command processing, generating and storing progress data and/or generating synthesized speech. A single server 120 may be capable of performing all speech processing or multiple server(s) 120 may combine to perform the speech processing. In addition, certain speech detection or command execution functions may be performed by device 110. Thus, the device 110 and/or the server(s) 120 may perform the functions described herein without departing from the disclosure.

Figure 6A:
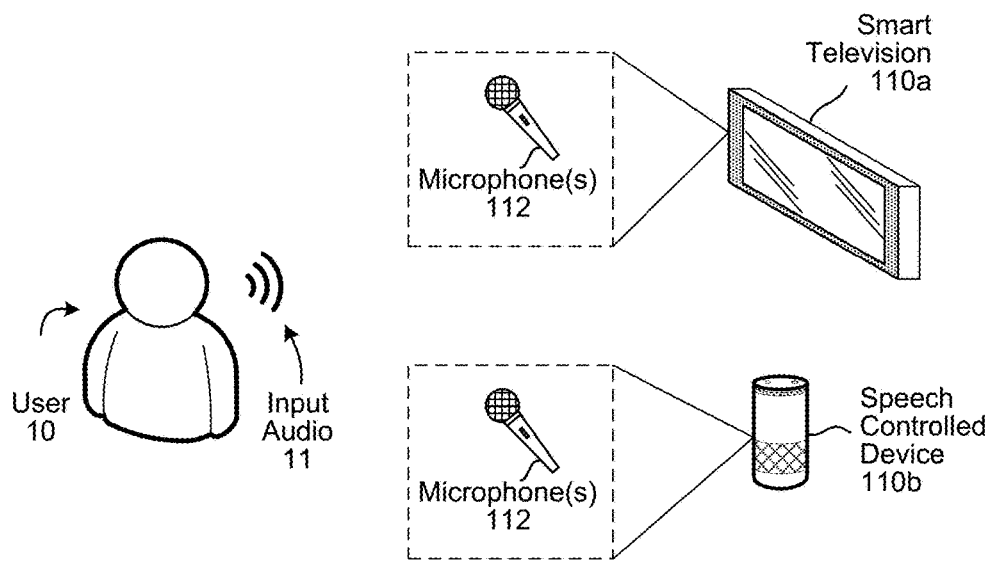
FIGS. 6A-6B illustrate examples of receiving audio input and content according to embodiments of the present disclosure.
Figure 6B:
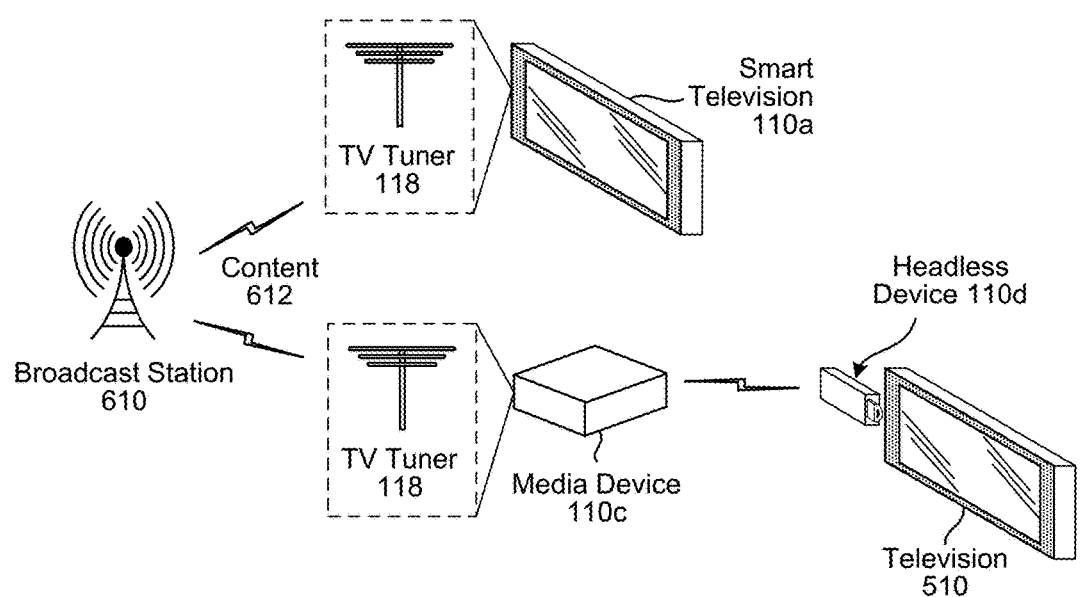

FIGS. 6A-6B illustrate examples of receiving audio input and content according to embodiments of the present disclosure. As illustrated in FIG. 6A, the system 100 may capture audio input 11 generated by a user 10 using microphone(s) 112 coupled to a device 110, such as a smart television 110a and/or a speech controlled device 110b. Thus, a voice command may be captured by a device 110a including an integrated display 116 and/or a device 110b that is not coupled to a display. When the audio data 111 is captured by the device 110a and the server(s) 120 determine that the first content is video data, the server(s) 120 may instruct the device 110a to output the first content using the integrated display 116.

However, when the audio data 111 is captured by the device 110b and the server(s) 120 determine that the first content is video data, the server(s) 120 may determine an output device associated with the device 110b and/or the audio data 111. For example, the device 110b may be in proximity to and/or associated with a smart television 110a, a media device 110c, a headless device 110d or another output device 100 that may output the first content on a display 116. Additionally or alternatively, the server(s) 120 may interpret the audio data 111 to determine a device 110 that may output the first content on a display 116. For example, the audio data 111 may correspond to a command to "tune to the Olympics in the living room" and the server(s) 120 may identify a device 110 associated with the living room. Thus, multiple devices 110 may be associated with a single user profile and the server(s) 120 may receive audio data 111 from one device and send an instruction to output first content to another device without departing from the disclosure.

In some examples, the system 100 may receive content on one device and may send the content to another device to output the content on a display. As illustrated in FIG. 6B, the system 100 may receive content 612 generated by a broadcast station 610 using a TV Tuner 118 coupled to a device 110, such as a smart television 110a and/or a media device 110c. Thus, the content 612 may be received by a device 110a including an integrated display 116 and/or a device 110c that is not coupled to a display. When the content 612 is received by the device 110a and the server(s) 120 determine that the content 612 is video data, the server(s) 120 may instruct the device 110a to output the content 612 using the integrated display 116.

However, when the content 612 is received by the device 110c and the server(s) 120 determine that the content 612 is video data, the server(s) 120 may determine an output device associated with the device 110c and/or the audio data 111. For example, the device 110c may be in proximity to and/or associated with a headless device 110d and the media device 110c may send the content 612 to the headless device 110d to output the content 612 on a television 510. Additionally or alternatively, the server(s) 120 may interpret the audio data 111 to determine a device 110 that may output the content 612 on a display 116. For example, the audio data 111 may correspond to a command to "tune to the Olympics in the living room" and the server(s) 120 may identify a device 110 associated with the living room. Thus, multiple devices 110 may be associated with a single user profile and the server(s) 120 may receive content 612 from one device and send the content to another device without departing from the disclosure.

Figure 7:
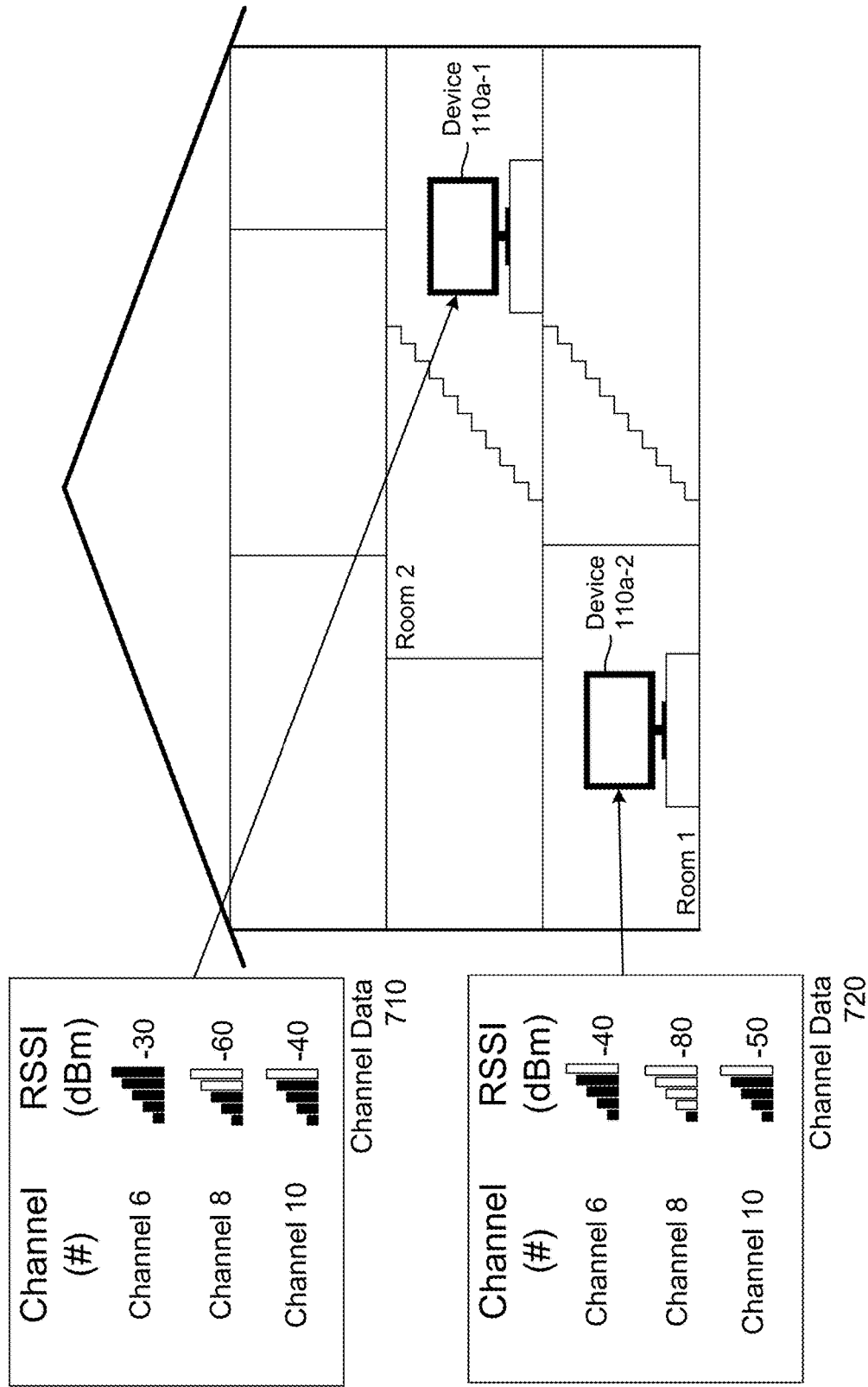
FIG. 7 illustrates an example of signal strengths according to embodiments of the present disclosure.

FIG. 7 illustrates an example of signal strengths according to embodiments of the present disclosure. As illustrated in FIG. 7, a first device 110a-1 may determine first channel data 710 indicating that Channel 6 has a strong signal strength (e.g., −30 dBm), Channel 8 has a low-normal signal strength (e.g., −60 dBm) and Channel 10 has a high-normal signal strength (e.g., −40 dBm). In contrast, a second device 110a-2 may determine second channel data 720 indicating that Channel 6 has a high-normal signal strength (e.g., −40 dBm), Channel 8 has a low signal strength (e.g., −80 dBm) and Channel 10 has a normal signal strength (e.g., −50 dBm). Thus, the first device 110a-1 may receive and output Channel 6, Channel 8 and Channel 10, whereas the second device 110a-2 may only receive and output Channel 6 and Channel 10, despite being in the same household.

Based on the first channel data 710, the server(s) 120 may generate first program data including information about content broadcast on channels 6, 8 and/or 10. Using the first program data to update a knowledge base and/or localized content domain, the server(s) 120 may determine voice commands associated with channels 6, 8 and/or 10. Based on the second channel data 710, the server(s) 120 may generate second program data including information about content broadcast only on channels 6 and/or 10. Using the second program data to update the knowledge base and/or localized content domain, the server(s) 120 may determine voice commands associated with channels 6 and 10, but not with channels 8. Thus, the server(s) 120 may dynamically populate the program data based on content available to the first device 110a-1 and/or the second device 110a-2.

In some examples, the server(s) 120 may update the knowledge base and/or localized content domain using the first program data and the second program data. Therefore, the server(s) 120 may determine voice commands associated with channels 6, 8 and/or 10, regardless of whether the voice command is associated with the first device 110a-1 or the second device 110a-2. If the voice command instructs the server(s) 120 to output content from Channel 8 on the first device 110a-1, the server(s) 120 may send an instruction to the first device 110a-1 to receive the content from Channel 8 and output the content to the user 10. However, if the voice command instructs the server(s) 120 to output content from Channel 8 on the second device 110a-2, the server(s) 120 may send an instruction to the second device 110a-2 to display a user interface/message to the user 10 that indicates that the content is unavailable on the second device 110a-2 but may be viewed on the first device 110a-1.

In some examples, the server(s) 120 may determine that the content may be received by another device 110 in the system 100 and sent to the second device 110a-2. For example, the media device 110c discussed above with regard to FIG. 6B may be capable of receiving content from Channel 8 and sending the content to the second device 110a-2 via the network(s) 10. In this example, the server(s) 120 may instruct the second device 110a-2 to display a user interface/message to the user 10 that indicates that the media device 110c may be used to send the content to the second device 110a-2.

In some examples, the server(s) 120 may use the signal strength associated with a channel to determine a weighting associated with the channel and/or content broadcast on the channel. For example, the first channel data 710 indicates that Channel 6 has a strong signal strength (e.g., −30 dBm) while Channel 8 has a low-normal signal strength (e.g., −60 dBm). The server(s) 120 may weight content and/or program data associated with Channel 6 more heavily than content and/or program data associated with Channel 8 based on the signal strengths. Additionally or alternatively, the server(s) 120 may weight Channel 6 and Channel 8 equally as the device 110 may receive and output both channels. Instead, the server(s) 120 may weight content and/or program data associated with a low signal strength (e.g., −65 dBm or below) lower than content and/or program data associated with a normal signal strength (e.g., −65 dBm and above).

In addition to over-the-air television broadcasts, the server(s) 120 may identify other content available to the system 100, including content stored on local storage 520, content accessible via a media playback device (e.g., compact discs (CDs) and/or digital video discs (DVDs) located in a CD/DVD player), streaming content accessible via subscriptions (e.g., Netflix, Prime Video, Hulu, Prime Audio, Spotify, Pandora, etc.). Thus, the content may include audio content and/or video content without departing from the disclosure. The streaming content may be associated with a particular device, a user profile, a household, an account or the like, and the server(s) 120 may determine the streaming content available based on user preferences, account settings, which device 110 receives the audio data 111 or the like.

In some examples, the program data may include information about content that is unavailable to any of the devices 110 on the system 100. If the server(s) 120 determine that a voice command is requesting content that is unavailable, the server(s) 120 may display a user interface/message to the user that indicates that the content is unavailable and/or indicates where the content may be available. For example, the content may be available on a streaming service that is not associated with the user profile, so the server(s) 120 may indicate that the content is available on the streaming service. Additionally or alternatively, the content may be available at a local venue (e.g., a sports game, live event, pay per view event or other content may be available at a bar, restaurant, or other local business) and the server(s) 120 may indicate the local venue.

FIGS. 8A-8B illustrate examples of receiving audio data and channel data according to embodiments of the present disclosure. In some examples, channel data may be sent to the server(s) 120 along with audio data and the server(s) 120 may interpret the audio data based on the channel data. As illustrated in FIG. 8A, a user 10 may generate first input audio 11a and a device 110a may capture first audio data 810 corresponding to the first input audio 11a. The device 110a may also detect localized content and may generate first channel data 812 indicating the localized content that is detected by the device 110a. Therefore, the device 110a may send the first audio data 810 and the first channel data 812 to the server(s) 120 at substantially the same time. Thus, the server(s) 120 may generate first program data corresponding to the first channel data 812 and interpret the first audio data 810 using the first program data.

Sending the first audio data 810 and the first channel data 812 at substantially the same time may be beneficial in certain applications. For example, this implementation may be beneficial when the first channel data 812 includes limited information, such as listing the channels detected by the device 110a and/or signal strengths associated with the channels. While there may be a delay while the server(s) 120 determine the first program data prior to interpreting the first audio data 810, the first program data will be current and may improve the speech processing results. In addition, this implementation may be beneficial when signal strengths associated with channels detected by the device 110a fluctuate on a regular basis.

In some examples, channel data may be sent to the server(s) 120 separately from audio data and the server(s) 120 may update a knowledge base using the channel data and interpret the audio data based on the knowledge base. As illustrated in FIG. 8B, the device 110a may detect localized content and may generate second channel data 820 indicating the localized content that is detected by the device 110a. The device 110a may send the second channel data 820 to the server(s) 120 and the server(s) 120 may determine second program data corresponding to the second channel data 820 and update the knowledge base with the second program data.

Separately from the server(s) 120 updating the knowledge base with the second program data, the user 10 may generate second input audio 11b and a device 110b may capture second audio data 822 corresponding to the second input audio 11b. The device 110b may send the second audio data 822 to the server(s) 120 and the server(s) 120 may interpret the second audio data 822 using the updated knowledge base, which includes the second program data and/or other program data.

Sending the second channel data 820 separately from the second audio data 822 may be beneficial as it may reduce a delay associated with the server(s) 120 determining the second program data. Instead, the server(s) 120 may determine the second program data and update the knowledge base prior to receiving the second audio data 822. Additionally or alternatively, this implementation may be beneficial as the server(s) 120 may receive channel data from multiple devices 110 and may update the knowledge base with program data corresponding to the multiple devices. In addition, this implementation is beneficial for interactions between multiple devices, such as when an output device (e.g., device 110 to which the server(s) 120 send a command to output content) is not capable of receiving voice commands and/or when an input device (e.g., device 110 from which the server(s) 120 receives the audio data 111) is not capable of outputting content on a display.

In some examples, the output devices may be televisions or other devices capable of displaying video content. Therefore, the channel data may correspond to over-the-air television broadcasts detected by an output device, content stored on a local storage device coupled to the output device or the like and may include information about a detected channel, a Transport Stream Identifier (TSID) (or Transmission Signal Identifier (TSID) for analog signals), call sign, station name, signal strength, etc. associated with the channel, and/or a program name (e.g., program title, content title, etc.), broadcast time (e.g., broadcast time period), genre, actors, sports leagues, sports teams, players, etc. associated with content broadcast by the channel and/or stored in the local storage device. Using the channel data, the server(s) 120 may generate program data that includes information about an output device, a channel number, TSID, call sign, station name, signal strength, etc. associated with a detected channel, and/or a program name (e.g., program title, content title, etc.), broadcast time (e.g., broadcast time period), genre, actors, directors, producers, sports leagues, sports teams, players, etc. associated with content broadcast on the channel or stored in the local storage device.

In other examples, the output devices may be speakers or other devices capable of outputting audio. Therefore, the channel data may correspond to over-the-air radio broadcasts detected by an output device, content stored on a local storage device coupled to the output device or the like and may include information about a detected channel, a TSID, call sign, station name, signal strength, etc. associated with the channel, and/or a song title, genre, artist name, album name, etc. associated with content broadcast by the channel and/or stored in the local storage device. Using the channel data, the server(s) 120 may generate program data that includes information about an output device, a radio frequency, TSID, call sign, station name, signal strength, etc. associated with a detected channel, and/or a song title, genre, artist name, album name, etc. associated with content broadcast on the channel or stored in the local storage device.

FIGS. 9A-9B illustrate examples of channel tables and a program table according to embodiments of the present disclosure. As illustrated in FIG. 9A, a first channel table 910 may include only a list of channels that are detected by a device 110. For example, the device 110 may detect Channels 6, 8 and 10 but not detect other channels (e.g., Channel 13, not shown). Similarly, a second channel table 912 may include a list of channels that are detected by the device 110 (e.g., Channels 6, 8 and 10) along with corresponding signal strengths (e.g., −30 dBm, −60 dBm and −40 dBm, respectively). However, the disclosure is not limited thereto and the device 110 may generate channel tables with varying levels of detail and/or categories of information without departing from the disclosure.

In some examples, the device 110 may receive program data associated with the content. For example, over-the-air television broadcasts may include content and program data corresponding to the content. Additionally or alternatively, the device 110 may receive a programming guide (e.g., program guide data) that corresponds to the localized content being broadcast for a duration of time (e.g., one week). In some examples, content stored in a local storage device 520 (e.g., Digital Video Recorder (DVR) or the like) may have been received from other sources, such as cable broadcasts or downloaded from the network(s) 10, and may include different and/or additional program data than what is included in the over-the-air television broadcasts. Additionally or alternatively, the user 10 may input program data.

FIG. 9B illustrates a program table 920 that includes local program guide data associated with the channels detected by the device 110. For example, the program table 920 indicates that the device 110 detects Channel 6, a call sign (e.g., WCSHDT), a station name (e.g., NBC), and a signal strength (e.g., −30 dBm) associated with Channel 6, and a program name (e.g. Olympics) and a genre (e.g., Sports) associated with content being broadcast on Channel 6. Similarly, the program table 920 indicates that the device 110 detects Channel 8, a call sign (e.g., WMTWDT), a station name (e.g., ABC), and a signal strength (e.g., −60 dBm) associated with Channel 8, and a program name (e.g. The Ellen DeGeneres Show), a genre (e.g., Talk) and actors (e.g., Ellen DeGeneres) associated with content being broadcast on Channel 8. Finally, the program table 920 indicates that the device 110 detects Channel 10, a call sign (e.g., WCBBDT), a station name (e.g., PBS), and a signal strength (e.g., −40 dBm) associated with Channel 10, and a program name (e.g. Charlie Rose) and a genre (e.g., Talk) associated with content being broadcast on Channel 10.

The device 110 may send the channel data and/or the local program guide data to the server(s) 120. As used herein, for ease of explanation "channel data" refers to the data sent from the device 110 to the server(s) 120, including channel data (e.g., first channel table 910 and/or second channel table 912) and/or local program guide data (e.g., program table 920). Thus, channel data refers to any information about channels detected by the device 110, content broadcast on the channels, content stored in a local storage device 520 or other localized content. In contrast, "program data" refers to data obtained and stored on the server(s) 120 about the localized content, including the channel data received from the device 110, information about the channel data (e.g., program guide data or other information) obtained from third party sources such as remote server(s) 20, or the like.

The server(s) 120 may generate the program data based on the channel data. For example, the server(s) 120 may generate a program table including the information included in the channel data (e.g., the first channel table 910, the second channel table 912 and/or the program table 920). Using the information included in the channel data, the server(s) 120 may obtain additional information from third party sources, such as program guide data from the remote server(s) 20.

For ease of illustration, FIGS. 9A-9B and 10B refer to specific channels using simplified examples (e.g., channel 006, channel 008, etc.). However, the disclosure is not limited thereto and specific channels may be identified using a transport stream identifier (TSID) without departing from the disclosure. For example, channel 006 may actually correspond to channel 6-01, which may be uniquely identified using TSID 0x088F. As channel numbers vary for broadcast stations throughout the United States, a channel 006 broadcast in one location may be a different station than a channel 006 broadcast in another location. For example, in one location Channel 6 may correspond to CBS, whereas in another location Channel 6 may correspond to ABC. The TSID is a unique identifier for each broadcast station that enables the system 100 to identify the broadcast station regardless of the local channel on which it is broadcast.

Figure 10A:
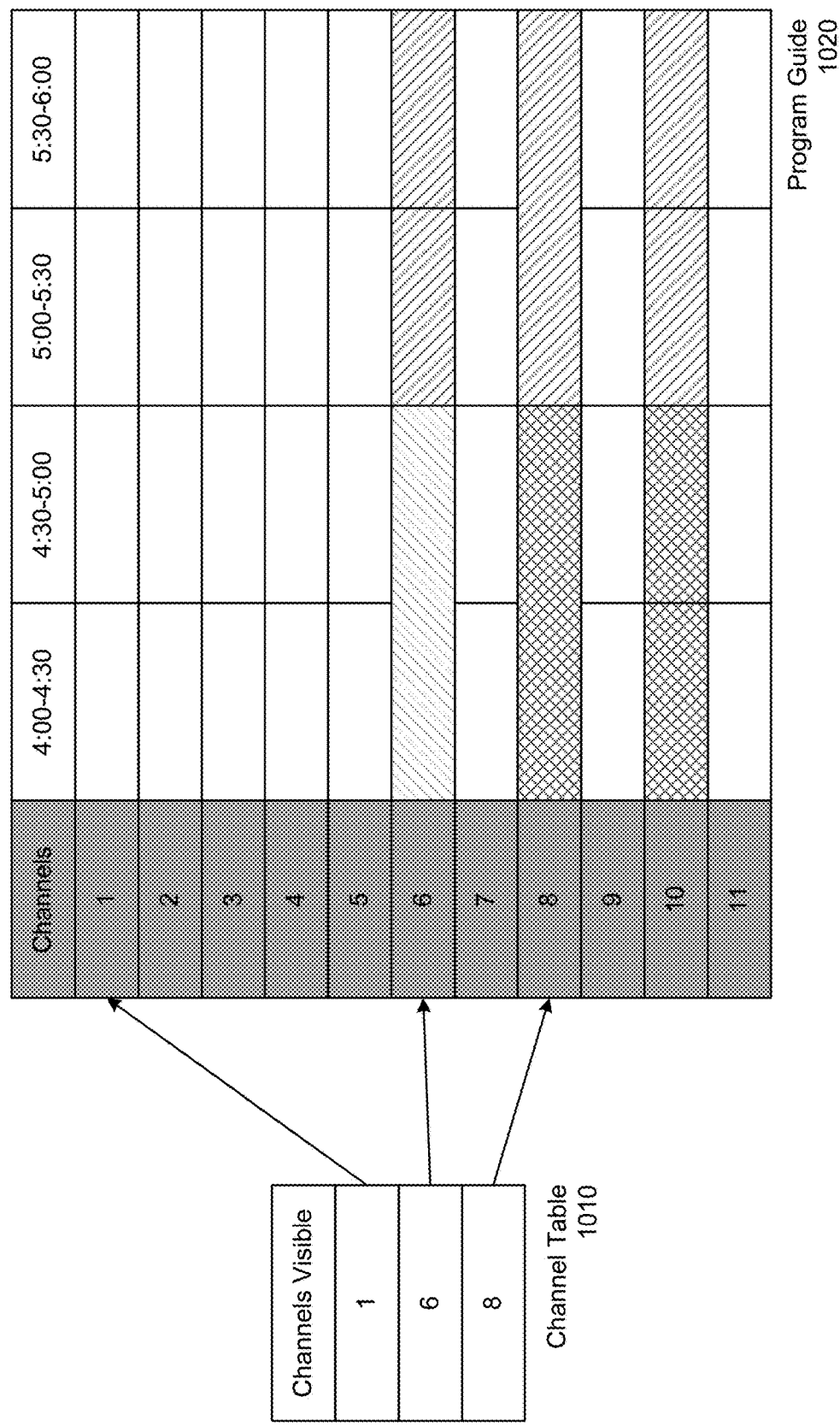

FIGS. 10A-10B illustrate an example of associating a channel table with a program guide to generate a program table according to embodiments of the present disclosure. As illustrated in FIG. 10A, the server(s) 120 may receive a channel table 1010 from the device 110, may receive a program guide 1020 from the remote server(s) 20 that corresponds to the channel table 1010 and may extract information from the program guide 1020 based on the channels listed in the channel table 1010. For example, the server(s) 120 may determine that the channel table 1010 indicates that the device 110 detects Channel 1, 6 and 8 and the server(s) 120 may extract information about Channels 1, 6 and 8 from the program guide 1020 while ignoring information about remaining channels that are not detected by the device 110.

Using the information extracted from the channel table 1010 and/or the program guide 1020, the server(s) 120 may generate a program table 1030 illustrated in FIG. 10B. The server(s) 120 may update a knowledge base associated with a localized content domain using the information included in the program table 1030. As illustrated in FIG. 10B, the program table 1030 may include a device identification, a channel number, a call sign, a station name, a signal strength, a broadcast time (e.g., broadcast time period), program name (e.g., program title, content title, etc.), broadcast time (e.g., broadcast time period), genre, actors, directors, producers and other information about a channel and/or content broadcast on the channel. However, the program table 1030 is intended as an illustrative example and disclosure is not limited thereto. Instead, the program data may vary and may include different categories based on the type of content. For example, as discussed above, the localized content may include audio content and the program data may vary accordingly. Additionally or alternatively, the program data may include categories associated with sporting events, such as a type of sport (e.g., football), a name or other identification associated with a sports league (e.g., NFL), a name or other identification associated with a sports team (e.g., New England Patriots, Patriots, etc.), name(s) of individual players (e.g., Tom Brady), etc.

FIG. 11 is a communication diagram conceptually illustrating an example of interpreting audio data based on program data according to embodiments of the present disclosure. As illustrated in FIG. 11, the device 110a may determine (1110) channel data, may capture (1112) audio data and may send (1114) the audio data and the channel data to the server(s) 120. The server(s) 120 may determine (1116) program data from the channel data, as discussed in greater detail above with regard to FIGS. 10A-10B.

The server(s) 120 may perform (1116) speech processing (e.g., ASR) on the audio data to determine first text data, may determine (1120) a command based on the first text data and the program data, may determine (1122) first content associated with the command and may send (1124) an instruction to output the first content on the first channel to the device 110*a*. The device 110*a* may receive (1126) the first content on the first channel and may output (1128) the first content on a display 116 of the device 110*a*.

As illustrated in FIG. 11, the device 110*a* may send the audio data and the corresponding channel data to the server(s) 120 at substantially the same time. The server(s) 120 may determine the program data corresponding to the channel data and determine the command to output the first content based on the program data. Thus, the server(s) 120 may update a knowledge base with the program data to improve speech processing associated with localized content on the device 110*a*.

Figure 12:
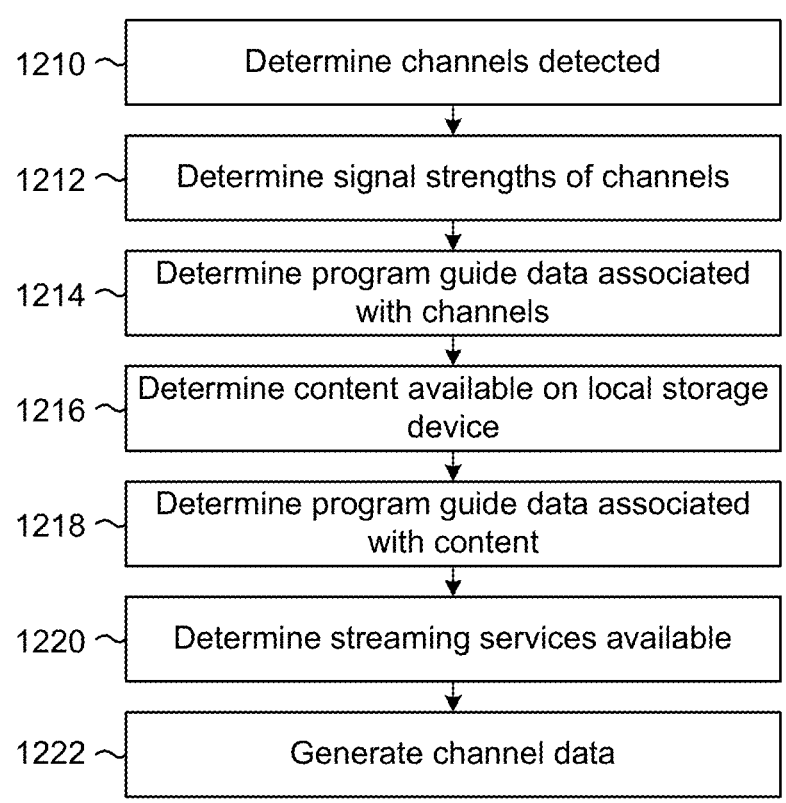
FIG. 12 is a flowchart conceptually illustrating an example method for generating channel data according to embodiments of the present disclosure.

FIG. 12 is a flowchart conceptually illustrating an example method for generating channel data according to embodiments of the present disclosure. As illustrated in FIG. 12, the device 110 may determine (1210) channels detected by the device 110 (e.g., over-the-air television broadcast channels, radio stations or the like), may determine (1212) signal strengths corresponding to the channels and may determine (1214) program guide data associated with the channels. The device 110 may determine (1216) content available on a local storage device and determine (1218) program guide data associated with the content. The device 110 may determine (1220) streaming services that are available to the device 110 and/or a user profile associated with the device 110. The device 110 may then generate (1222) channel data including information about the channels, the signal strengths associated with the channels, the content broadcast on the channels, the content available on the local storage device and the streaming services available.

Figure 13:
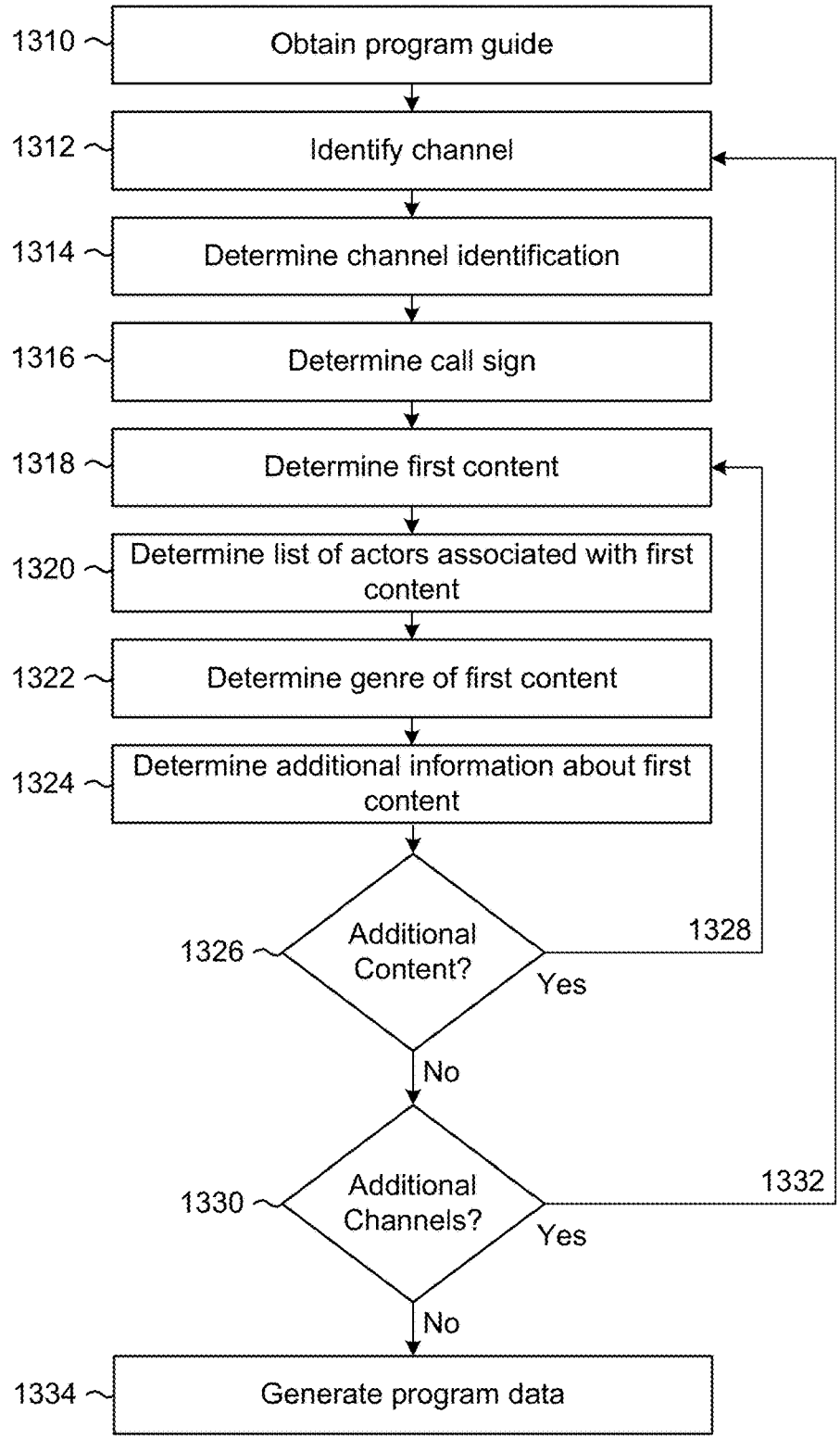
FIG. 13 is a flowchart conceptually illustrating an example method for generating program data according to embodiments of the present disclosure.

FIG. 13 is a flowchart conceptually illustrating an example method for generating program data according to embodiments of the present disclosure. As illustrated in FIG. 13, the server(s) 120 may obtain (1310) a program guide from a third party source such as the remote server(s) 20. For example, the program guide may indicate information about content being broadcast on every channel in a geographic region. The server(s) 120 may identify (1312) a channel included in the channel data, determine (1314) a channel identification associated with the channel and determine (1316) a call sign associated with the channel. For example, the server(s) 120 may identify Channel 6, determine that Channel 6 has the channel identification of NBC and the call sign of WCSHDT. Using the program guide, the server(s) 120 may determine (1318) first content broadcast on the channel, determine (1320) a list of actors associated with the first content, determine (1322) a genre associated with the first content and determine (1324) additional information about the first content. For example, the first content may be a movie such as Saving Private Ryan and the server(s) 120 may determine that the first content is a Drama that includes Tom Hanks and Matt Damon and was produced and directed by Steven Spielberg.

The server(s) 120 may determine (1326) if there is information about additional content broadcast on the channel (e.g., information about content after the first content) and if so, may loop (1328) to step 1318 and repeat steps 1318-1324 for the additional content. If there is not additional content, the server(s) 120 may determine (1330) if there are additional channels included in the channel data and, if so, may loop (1332) to step 1312 to identify an additional channel and perform steps 1312-1328 for the additional channel. If the server(s) 120 determine that there aren't additional channels, the server(s) 120 may generate (1334) program data including the information obtained in steps 1314-1324.

While FIG. 11 illustrates a single device (e.g., device 110*a*) sending the channel data and the audio data, the disclosure is not limited thereto. Instead, as described above with regard to FIG. 8B, a first device (e.g., device 110*a*) may send channel data and a second device (e.g., device 110*b*) may send audio data separately from the channel data. Thus, the server(s) 120 may receive channel data from one or more devices 110, may generate program data corresponding to the channel data and may update a knowledge base associated with a user profile based on the program data.

FIG. 14 is a communication diagram conceptually illustrating an example of generating program data and updating a knowledge base according to embodiments of the present disclosure. As illustrated in FIG. 14, the device 110*a* may determine (1410) first channel data associated with channels detected by the device 110*a* and may send (1412) the first channel data to the server(s) 120. For example, the device 110*a* may perform a channel scan to determine signal strengths corresponding to individual channels and may determine which channels were associated with a signal strength exceeding a threshold. Thus, the device 110*a* may determine that signal strengths associated with Channels 6, 8 and 10 exceeded the threshold but that a signal strength associated with Channel 13 did not. Therefore, the first channel data may include information about Channels 6, 8 and 10.

Based on the first channel data, the server(s) 120 may determine (1414) first program data and may update (1416) a knowledge base for a user profile associated with the device 110*a* using the first program data. For example, the server(s) 120 may perform the example method illustrated in FIG. 13 to determine the first program data based on the first channel data.

The device 110*c* may determine (1418) second channel data associated with channels detected by the device 110*c* and may send (1420) the second channel data to the server(s) 120. For example, the device 110*a* may perform a channel scan to determine signal strengths corresponding to individual channels and may determine which channels were associated with a signal strength exceeding a threshold. Thus, the device 110*c* may determine that signal strengths associated with Channels 6, 10 and 13 exceeded the threshold but that a signal strength associated with Channel 8 did not. Therefore, the second channel data may include information about Channels 6, 10 and 13.

Based on the second channel data, the server(s) 120 may determine (1422) second program data and may update (1424) the knowledge base for the user profile associated with the device 110*c* using the second program data. For example, the server(s) 120 may perform the example method illustrated in FIG. 13 to determine the second program data based on the second channel data.

FIG. 15 is a communication diagram conceptually illustrating an example of interpreting audio data based on program data according to embodiments of the present disclosure. As illustrated in FIG. 15, the device 110*b* may capture (1510) audio data and send (1512) the audio data to the server(s) 120. The server(s) 120 may retrieve the program data associated with the user profile, may perform (1516) speech processing on the audio data to determine first text data, may determine (1518) a command based on the first text data and the program data (e.g., knowledge base, localized content domain, etc.), may determine (1520) first content associated with the command and may send (1522)

an instruction to output the first content on a first channel to the device 110a. For example, the server(s) 120 may determine that the audio data corresponds to first text data (e.g., "tune in to the Olympics") and that the first text data corresponds to a command to output the Olympics broadcast (e.g., content broadcast on Channel 6) using the device 110a. In response to receiving the instruction, the device 110a may receive (1524) the first content on the first channel and may output (1526) the first content on a display of the device 110a.

While not illustrated in FIG. 15, the server(s) 120 may identify that the device 110a is associated with the audio data and/or the first text data. For example, the server(s) 120 may determine that the device 110a is in proximity to and/or in associated with the device 110b, such that commands received from the device 110b that request the system 100 to output video data are associated with the device 110a. Additionally or alternatively, the server(s) 120 may determine that the device 110a is to be selected to output any video data, such that commands received by the system 100 that request the system 100 to output video data are associated with the device 110a. Additionally or alternatively, the server(s) 120 may determine to output the video data using the device 110a based on the first text data. For example, the first text data may indicate "tune in to the Olympics in the living room" and the server(s) 120 may determine that the device 110a is associated with the living room. In some examples, the first text data may indicate "tune in to the Olympics on the Samsung television" and the server(s) 120 may determine that the device 110a is a Samsung television. The server(s) 120 may identify the device 110a as being associated with the first text data using other techniques known to one of skill in the art without departing from the disclosure.

As illustrated in FIGS. 16A-16C and 17, the system 100 may interpret a voice command based on information included in program data. For example, the system 100 may identify channel data associated with output devices, obtain program data corresponding to the channel data and update a knowledge base associated with a localized content domain using information included in the program data. When receiving audio data including a voice command (e.g., "tune to the Olympics"), the server(s) 120 may identify a command associated with the program data (e.g., "tune to"), determine that the command is associated with the program data, may identify the first content (e.g., using keywords such as "Olympics") and may send an instruction to an output device to output the first content (e.g., tune to the Olympics on channel 006).

In some examples, the output devices may be televisions or other devices capable of displaying video content. Therefore, the channel data may correspond to over-the-air television broadcasts detected by an output device, content stored on a local storage device coupled to the output device or the like and may include information about a detected channel, a TSID, call sign, station name, signal strength, etc. associated with the channel, and/or a program name (e.g., program title, content title, etc.), broadcast time (e.g., broadcast time period), genre, actors, sports leagues, sports teams, players, etc. associated with content broadcast by the channel and/or stored in the local storage device. Using the channel data, the server(s) 120 may generate program data that includes information about an output device, a channel number, TSID, call sign, station name, signal strength, etc. associated with a detected channel, and/or a program name (e.g., program title, content title, etc.), broadcast time (e.g., broadcast time period), genre, actors, directors, producers, sports leagues, sports teams, players, etc. associated with content broadcast on the channel or stored in the local storage device.

In other examples, the output devices may be speakers or other devices capable of outputting audio. Therefore, the channel data may correspond to over-the-air radio broadcasts detected by an output device, content stored on a local storage device coupled to the output device or the like and may include information about a detected channel, a TSID, call sign, station name, signal strength, etc. associated with the channel, and/or a song title, genre, artist name, album name, etc. associated with content broadcast by the channel and/or stored in the local storage device. Using the channel data, the server(s) 120 may generate program data that includes information about an output device, a radio frequency, TSID, call sign, station name, signal strength, etc. associated with a detected channel, and/or a song title, genre, artist name, album name, etc. associated with content broadcast on the channel or stored in the local storage device.

FIGS. 16A-16C are communication diagrams conceptually illustrating examples of determining commands based on program data according to embodiments of the present disclosure. While FIGS. 16A-16C illustrate a system 100 capturing audio data using a first device 110b (e.g., speech controlled device 110b) and outputting first content on a display of a second device 110a (e.g., television 110a), the disclosure is not limited thereto. Instead, a device 110 may capture the audio data and output the first content without departing from the disclosure, and/or the first content may be output on any output device(s) 110 without departing from the disclosure. Additionally or alternatively, while FIGS. 16A-16C illustrate the first content being video data output on a display, the first content may be audio data output by speakers 114 of an output device 110.

As illustrated in FIG. 16A, the device 110b may capture (1610) audio data using microphone(s) 112 on the device 110b and may send (1612) the audio data to the server(s) 120. The server(s) 120 may perform (1614) speech processing (e.g., ASR) on the audio data to determine first text data.

The server(s) 120 may determine (1616) a first command based on the first text data using a first model (e.g., using Natural Language Understanding (NLU)) and may determine (1618) a first confidence score associated with the first command. The first model may correspond to information included in the program data, such that the server(s) 120 may analyze the first text data using the program data to determine the first command and the first confidence score. For example, the first text data may correspond to "tune to the Olympics" and the server(s) 120 may identify that the word "Olympics" is associated with first content that is broadcast on a first channel based on the program data. Additionally or alternatively, the server(s) 120 may determine that the keyword "tune to" corresponds to a command associated with the program data. Based on this, the server(s) 120 may determine that "tune to the Olympics" is the first command (e.g., requesting the server(s) 120 to send an instruction to an output device to tune to channel 006 and output the Olympics), and may determine the first confidence score associated with the first command.

In some examples, the server(s) 120 may generate a separate domain (e.g., localized content domain) that corresponds to the program data. As discussed above with regard to FIG. 2, a domain may represent a discrete set of activities having a common theme and may be associated with a particular language model and/or grammar database, a particular set of intents/actions, and a particular personalized lexicon. Each gazetteer may include domain-indexed lexical information associated with a particular user and/or device. For example, the localized content domain lexical information for video content might include names of output devices, channel numbers, TSIDs, call signs, station names, etc. associated with a detected channel, and/or program names, genres, actors, directors, producers, sports leagues, sports teams, players, etc. associated with content broadcast on the channel or stored in the local storage device. As another example, the localized content domain lexical information for audio content might include names of output devices, radio frequencies, TSIDs, call signs, station names, etc. associated with a detected channel, and/or song titles, genres, artist names, album names, etc. associated with content broadcast on the channel or stored in the local storage device. Thus, the server(s) 120 may determine the first command and the first confidence score using the new domain (e.g., localized content domain).

The server(s) 120 may determine (1620) a second command based on the first text data using a second model and may determine (1622) a second confidence score associated with the second command. While the first model may correspond to the program data/localized content domain, the second model may correspond to other language models and/or domains. For example, the second model may correspond to other domains such as "shopping," "music," "calendaring," etc., and a music-domain lexical information might include album titles, artist names, and song names, for example, whereas a user's contact-list lexical information might include the names of contacts.

The server(s) 120 may determine (1624) that the first confidence score is higher than the second confidence score, may select (1626) the first command and may determine (1628) first content corresponding to the first command using the first model. For example, the server(s) 120 may identify the first content corresponding to the first command included in the program data.

The server(s) 120 may send (1630) an instruction to the device 110a to output the first content on the first channel and the device 110a may receive (1632) the first content on the first channel and may output (1634) the first content on a display 116 associated with the device 110a. For example, FIG. 16A illustrates the device 110a as a smart television, so the device 110a may output the first content on an integrated display 116. However, the disclosure is not limited thereto and a media device 110c may receive the first content and send the first content to a television 510 and/or a headless device 110d coupled to the television 510, or the headless device 110d may receive the first content and send the first content to the television 510, without departing from the disclosure.

As illustrated in FIG. 16B, the device 110b may capture (1610) audio data using the microphone(s) 112 on the device 110b, may send (1612) the audio data to the server(s) 120 and the server(s) 120 may perform (1614) speech processing (e.g., ASR) on the audio data to determine first text data, as discussed above with regard to FIG. 16A.

In contrast to FIG. 16A, however, the server(s) 120 may determine (1656) a first command based on the first text data (e.g., Natural Language Understanding (NLU)). The server(s) 120 may determine (1658) a first confidence score that the first command is associated with the first model, may determine (1660) a second confidence score that the first command is associated with the second model, and may determine (1662) that the first confidence score is higher than the second confidence score. As discussed above with regard to FIG. 16A, the first model may correspond to the program data/localized content domain while the second model may correspond to other language models and/or domains, such as "shopping," "music," "calendaring," etc.

As discussed with regard to FIG. 16A, the server(s) 120 may determine (1628) first content corresponding to the first command using the first model (e.g., program data, localized content domain, etc.) and may send (1630) an instruction to the device 110a to output the first content on the first channel, and the device 110a may receive (1632) the first content on the first channel and may output (1634) the first content on a display 116 associated with the device 110a. For example, FIG. 16B illustrates the device 110a as a smart television, so the device 110a may output the first content on an integrated display 116. However, the disclosure is not limited thereto and a media device 110c may receive the first content and send the first content to a television 510 and/or a headless device 110d coupled to the television 510, or the headless device 110d may receive the first content and send the first content to the television 510, without departing from the disclosure.

As illustrated in FIG. 16C, the device 110b may capture (1610) audio data using microphone(s) 112 on the device 110b and may send (1612) the audio data to the server(s) 120.

The server(s) 120 may perform (1650) speech processing (e.g., ASR and NLU) on the audio data using a first model (e.g., domain) to determine a first command and may determine (1652) a first confidence score associated with the first command. For example, the server(s) 120 may use the first model to perform speech processing on the audio data to determine first text and determine the first command based on the first text.

The server(s) 120 may perform (1654) speech processing (e.g., ASR and NLU) on the audio data using a second model (e.g., domain) to determine a second command and may determine (1656) a second confidence score associated with the second command. For example, the server(s) 120 may use the second model to perform speech processing on the audio data to determine second text and determine the second command based on the second text. While the first model may correspond to the program data/localized content domain, the second model may correspond to other language models and/or domains. For example, the second model may correspond to other domains such as "shopping," "music," "calendaring," etc., and a music-domain lexical information might include album titles, artist names, and song names, for example, whereas a user's contact-list lexical information might include the names of contacts.

The server(s) 120 may determine (1624) that the first confidence score is higher than the second confidence score, may select (1626) the first command and may determine (1628) first content corresponding to the first command using the first model. For example, the server(s) 120 may identify the first content corresponding to the first command included in the program data.

The server(s) 120 may send (1630) an instruction to the device 110a to output the first content on the first channel and the device 110a may receive (1632) the first content on the first channel and may output (1634) the first content on a display 116 associated with the device 110a. For example, FIG. 16C illustrates the device 110a as a smart television, so the device 110a may output the first content on an integrated display 116. However, the disclosure is not limited thereto and a media device 110c may receive the first content and send the first content to a television 510 and/or a headless device 110d coupled to the television 510, or the headless device 110*d* may receive the first content and send the first content to the television 510, without departing from the disclosure.

Figure 17:
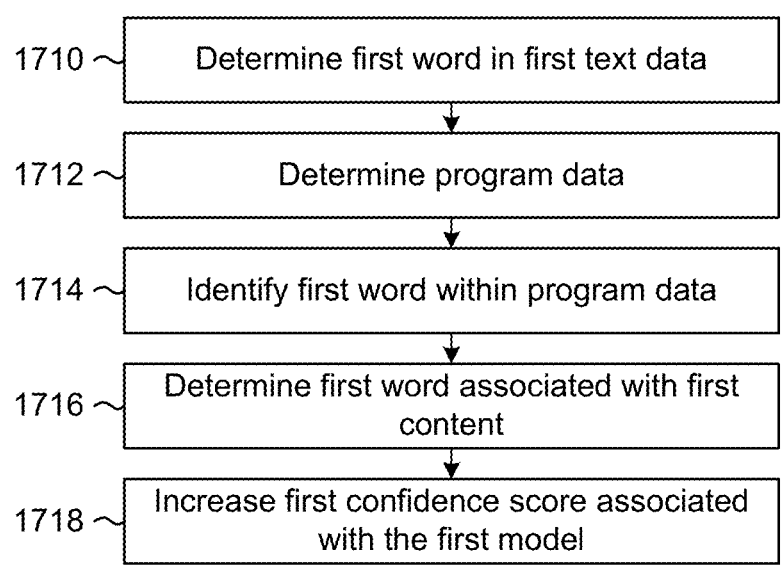
FIG. 17 is a flowchart conceptually illustrating an example method of identifying a word in program data and increasing a confidence score according to embodiments of the present disclosure.

In some examples, the server(s) 120 may determine the first confidence score illustrated in FIGS. 16A-16C by identifying words in the first text data within the program data. FIG. 17 is a flowchart conceptually illustrating an example method of identifying a word in program data and increasing a confidence score according to embodiments of the present disclosure. As illustrated in FIG. 17, the server(s) 120 may determine (1710) a first word in the first text data, may determine (1712) program data, may identify (1714) the first word within the program data, may determine (1716) that the first word is associated with first content and may increase (1718) the first confidence score associated with the first model. For example, if the text data corresponds to "tune to the Olympics," the server(s) 120 may identify "Olympics" in the text data, identify that "Olympics" is included in the program data and determine that "Olympics" is associated with a program currently being broadcast on a channel that is detected by an output device (e.g., television). As a result, the server(s) 120 may increase a confidence score associated with a first command to output the program on the output device. If the first confidence score exceeds other confidence scores and the server(s) 120 selects the first command, the server(s) 120 may send an instruction to the output device to output the program (e.g., tune to the Olympics on channel 006).

While FIG. 17 illustrates an example of increasing a confidence score based on a keyword associated with first content, the example is intended for illustrative purposes only and the disclosure is not limited thereto. Instead, the server(s) 120 may increase a confidence score based on multiple criteria, such as broadcast time periods (e.g., increasing confidence scores for content currently being broadcast and/or about to be broadcast), historical data (e.g., user history indicating that the user 10 frequently watches content), user preferences (e.g., user history indicating that the user 10 prefers a specific genre, language, actor, etc. included in the program data), social network data associated with the user 10, or the like. The user history (e.g., historical data, user preferences, etc.) and/or information associated with the social network data (e.g., social network account, social network data, etc.) may be stored in the user profile and/or a knowledge base for the user profile.

In some examples, the server(s) 120 may interpret the voice command based on broadcast time periods associated with the program data. For example, the server(s) 120 may identify multiple commands/content and may determine confidence scores associated with the commands/content. When determining the confidence scores, the server(s) 120 may determine broadcast time periods corresponding to the commands/content and may increase confidence scores associated with broadcast time periods near a current time (e.g., content currently being broadcast or soon to be broadcast). For example, the server(s) 120 may determine that first content is being broadcast at a first broadcast time period (e.g., currently being broadcast) and may increase a confidence score associated with the first content, whereas the server(s) 120 may determine that second content is being broadcast at a second broadcast time period (e.g., in several hours/days) and may not change the confidence score and/or may reduce the confidence score associated with the second content.

In some examples, the server(s) 120 may interpret the voice command based on the user history. For example, the server(s) 120 may identify multiple commands/content and may determine confidence scores associated with the commands/content. When determining the confidence scores, the server(s) 120 may determine that the user 10 frequently watches first content and may increase a confidence score associated with the first content.

In some examples, the server(s) 120 may interpret the voice command based on the social network data. For example, the server(s) 120 may identify multiple commands/content and may determine confidence scores associated with the commands/content. When determining the confidence scores, the server(s) 120 may determine that the user 10 published social network data to a social network that is associated with first content and may increase a confidence score associated with the first content. For example, the user 10 may publish social network data referencing a program title and/or a hashtag associated with the first content.

In some examples, the server(s) 120 may be unable to determine a command and/or content with a high degree of certainty. For example, the server(s) 120 may determine confidence scores associated with the command/first content and none of the confidence scores may exceed a threshold. Additionally or alternatively, several confidence scores may exceed the threshold and be substantially similar. Thus, the server(s) 120 may be unable to select a single command/content based on the confidence scores.

To identify the command/content, the server(s) 120 may perform disambiguation techniques known to one of skill in the art. The server(s) 120 may perform the disambiguation techniques based on the broadcast time periods, historical data (e.g., user history), user preferences or the like. In some examples, the server(s) 120 may use the historical data to identify the command/content based on what the user 10 has previously watched. For example, the audio data may correspond to an utterance of "tune to the Simpsons" and the server(s) 120 may determine that the user 10 frequently watches "The Simpsons" on a specific channel (e.g., Channel 51). Therefore, the server(s) 120 may identify the specific channel and send an instruction to the device 110 to output the selected content (e.g., The Simpsons") using the selected channel (e.g., Channel 51).

Additionally or alternatively, the server(s) 120 may send a list of potential commands/content to the device 110 and the device 110 may display the list to the user 10 and request that the user 10 selects the appropriate command/content. For example, the audio data may correspond to an utterance of "tune to the Simpsons" and the server(s) 120 may determine that there are multiple episodes of the Simpsons on different channels and at a different broadcast times (e.g., broadcast time periods), as well as a movie. To resolve the disambiguation, the server(s) 120 may send a list of the episodes and the movie to the device 110 and request that the user 10 specify the episode or movie to output. The device 110 may display the list of episodes and the movie, receive an input from the user 10 and send an indication of the selection to the server(s) 120. The server(s) 120 may identify the selected content and send an instruction to the device 110 to output the selected content.

Figure 18A:
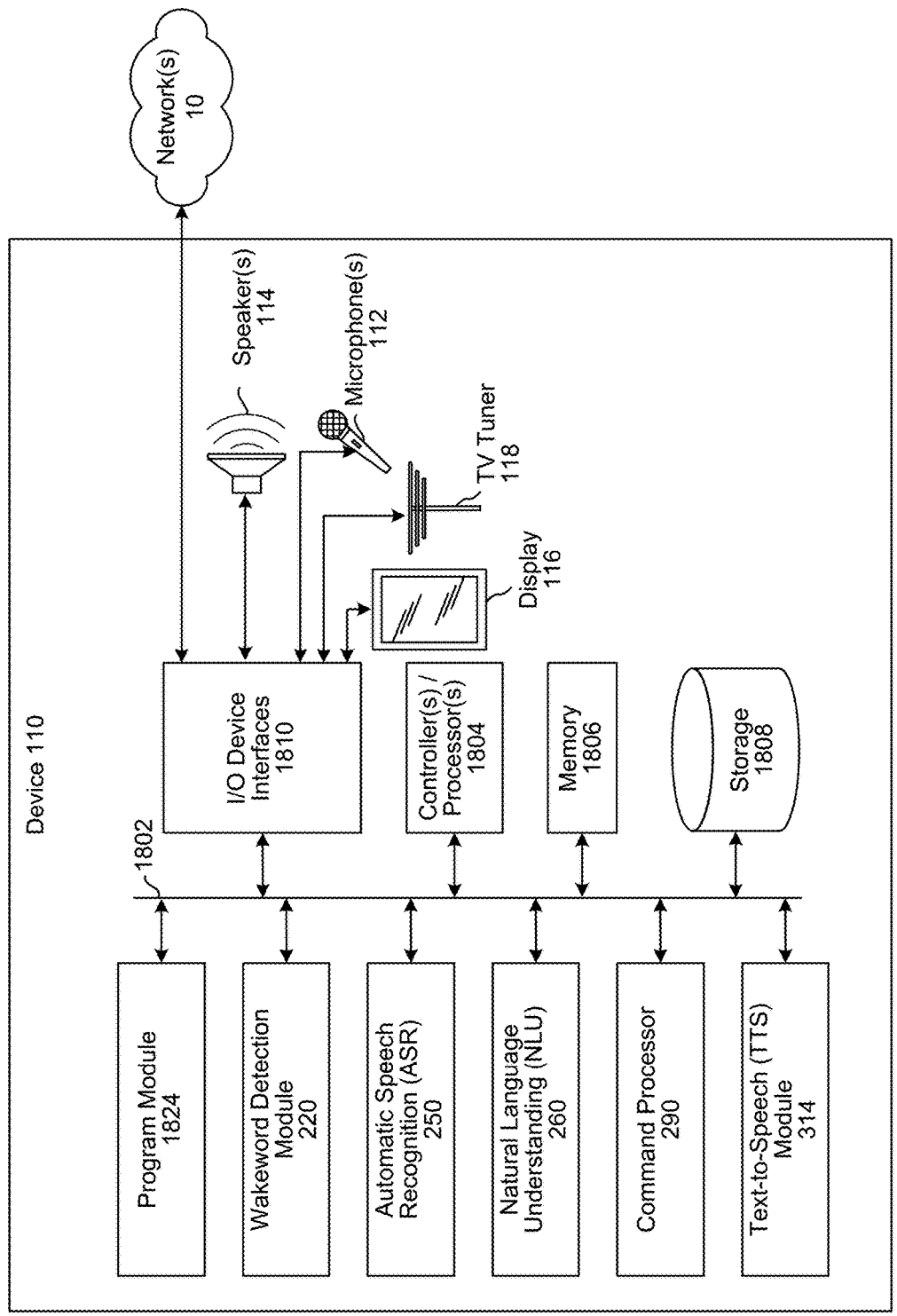
FIGS. 18A-18B are block diagrams conceptually illustrating example components of a system for echo cancellation according to embodiments of the present disclosure.
Figure 18B:
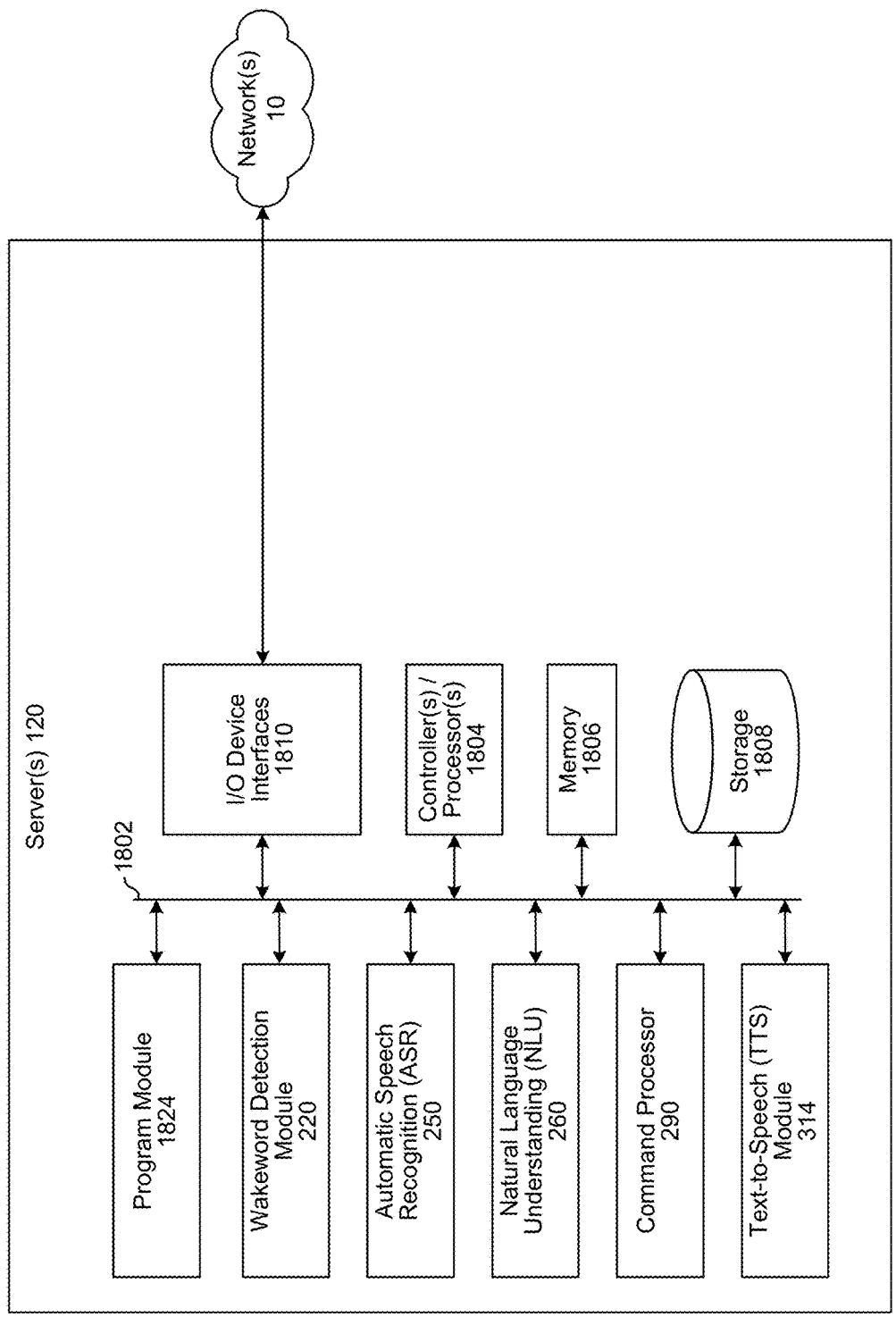

FIG. 18A is a block diagram conceptually illustrating a local device 110 that may be used with the described system 100. FIG. 18B is a block diagram conceptually illustrating example components of a remote device, such as a remote server(s) 120 that may assist with Automatic Speech Recognition (ASR), Natural Language Understanding (NLU) processing, command processing, generating and storing progress data and/or generating synthesized speech. Multiple such server(s) 120 may be included in the system, such as one server(s) 120 for ASR, one server(s) 120 for NLU, etc.

In operation, the system 100 may include computer-readable and computer-executable instructions that reside on the device 110 and/or server(s) 120, as will be discussed further below. The device 110 may be an electronic device capable of receiving voice commands, generating synthesized speech, receiving audio/video content, generating audio output and/or generating video output. Examples of electronic devices may include computers (e.g., a desktop, a laptop, a server or the like), portable devices (e.g., a smart phone, tablet or the like), media devices (e.g., televisions, video game consoles, media components or the like) or the like. The device 110/server(s) 120 may also be a component of any of the abovementioned devices or systems.

As illustrated in FIGS. 18A-18B, the device 110/server(s) 120 may include an address/data bus 1802 for conveying data among components of the device 110/server(s) 120. Each component within the device 110/server(s) 120 may also be directly connected to other components in addition to (or instead of) being connected to other components across the bus 1802.

The device 110/server(s) 120 may include one or more controllers/processors 1804, that may each include a central processing unit (CPU) for processing data and computer-readable instructions, and a memory 1806 for storing data and instructions. The memory 1806 may include volatile random access memory (RAM), non-volatile read only memory (ROM), non-volatile magnetoresistive (MRAM) and/or other types of memory. The device 110/server(s) 120 may also include a data storage component 1808, for storing data and controller/processor-executable instructions (e.g., instructions to perform the algorithm illustrated in FIGS. 1, 11, 12, 13, 14, 15, 16A-16C and/or 17). The data storage component 1808 may include one or more non-volatile storage types such as magnetic storage, optical storage, solid-state storage, etc. The device 110/server(s) 120 may also be connected to removable or external non-volatile memory and/or storage (such as a removable memory card, memory key drive, networked storage, etc.) through the input/output device interfaces 1810.

The device 110/server(s) 120 includes input/output device interfaces 1810. A variety of components may be connected through the input/output device interfaces 1810, such as a microphone(s) 112, speakers 114, a display 116 and/or TV tuner 118 connected to the device 110. However, the disclosure is not limited thereto and the device 110 may not include integrated microphone(s) 112, speakers 114, display 116 and/or TV tuner 118. Thus, the microphone(s) 112, speakers 114, display 116, TV tuner 118 and/or other components may be integrated into the device 110 or may be separate from the device 110 without departing from the disclosure. In some examples, the device 110 may include an inertial measurement unit (IMU), gyroscope, accelerometers or other component configured to provide motion data or the like associated with the device 110. If an array of microphones 112 is included, approximate distance to a sound's point of origin may be performed acoustic localization based on time and amplitude differences between sounds captured by different microphones of the array. The device 110 (using microphone 112, wakeword detection module 220, ASR module 250, etc.) may be configured to determine audio data corresponding to detected audio. The device 110 (using input/output device interfaces 1810, etc.) may also be configured to transmit the audio data to server(s) 120 for further processing or to process the data using internal components such as a wakeword detection module 220.

The input/output device interfaces 1810 may be configured to operate with network(s) 10, for example a wireless local area network (WLAN) (such as WiFi), Bluetooth, ZigBee and/or wireless networks, such as a Long Term Evolution (LTE) network, WiMAX network, 3G network, etc. The network(s) 10 may include a local or private network or may include a wide network such as the internet. Devices may be connected to the network 1820 through either wired or wireless connections.

The input/output device interfaces 1810 may also include an interface for an external peripheral device connection such as universal serial bus (USB), FireWire, Thunderbolt, Ethernet port or other connection protocol that may connect to network(s) 10. The input/output device interfaces 1810 may also include a connection to an antenna (not shown) to connect one or more network(s) 10 via an Ethernet port, a wireless local area network (WLAN) (such as WiFi) radio, Bluetooth, and/or wireless network radio, such as a radio capable of communication with a wireless communication network such as a Long Term Evolution (LTE) network, WiMAX network, 3G network, etc.

The device 110 and/or the server(s) 120 may include a wakeword detection module 220, an automatic speech recognition (ASR) 250, a natural language understanding (NLU) 260, a command processor 290 and/or a text-to-speech (TTS) module 314 as described above with regard to FIGS. 2-10.

The ASR module 250 in device 110 may be of limited or extended capabilities. The ASR module 250 may include the language models 254 stored in ASR model storage component 252, and an ASR module 250 that performs the automatic speech recognition process. If limited speech recognition is included, the ASR module 250 may be configured to identify a limited number of words, such as keywords detected by the device, whereas extended speech recognition may be configured to recognize a much larger range of words.

The device 110 and/or server(s) 120 may include a limited or extended NLU module 260. The NLU module in device 110 may be of limited or extended capabilities. The NLU module 260 may comprise the name entity recognition module 262, the intent classification module 264 and/or other components. The NLU module 260 may also include a stored knowledge base and/or entity library, or those storages may be separately located.

The device 110 and/or server(s) 120 may also include a command processor 290 that is configured to execute commands/functions associated with a spoken command as described above.

The device 110 may include a wakeword detection module 220, which may be a separate component or may be included in an ASR module 250. The wakeword detection module 220 receives audio signals and detects occurrences of a particular expression (such as a configured keyword) in the audio. This may include detecting a change in frequencies over a specific period of time where the change in frequencies results in a specific audio signature that the system recognizes as corresponding to the keyword. Keyword detection may include analyzing individual directional audio signals, such as those processed post-beamforming if applicable. Other techniques known in the art of keyword detection (also known as keyword spotting) may also be used. In some embodiments, the device 110 may be configured collectively to identify a set of the directional audio signals in which the wake expression is detected or in which the wake expression is likely to have occurred.

The wakeword detection module 220 receives captured audio and processes the audio (for example, using model(s) 232) to determine whether the audio corresponds to particular keywords recognizable by the device 110 and/or system 100. The storage 1808 may store data relating to keywords and functions to enable the wakeword detection module 220 to perform the algorithms and methods described above. The locally stored speech models may be preconfigured based on known information, prior to the device 110 being configured to access the network by the user. For example, the models may be language and/or accent specific to a region where the user device is shipped or predicted to be located, or to the user himself/herself, based on a user profile, etc. In an aspect, the models may be pre-trained using speech or audio data of the user from another device. For example, the user may own another user device that the user operates via spoken commands, and this speech data may be associated with a user profile. The speech data from the other user device may then be leveraged and used to train the locally stored speech models of the device 110 prior to the user device 110 being delivered to the user or configured to access the network by the user. The wakeword detection module 220 may access the storage 1808 and compare the captured audio to the stored models and audio sequences using audio comparison, pattern recognition, keyword spotting, audio signature, and/or other audio processing techniques.

In some examples, the device 110 may not include the ASR 250, the NLU 260, the command processor 290 and/or the TTS module 314. Instead, the server(s) 120 may include these components and may receive audio input, perform ASR/NLU on the audio input to generate and store program data, determine a command and/or generate synthesized speech. Thus, the device 110 may receive data and/or instructions from the server(s) 120 to perform functionality associated with the ASR 250, the NLU 260, the command processor 290 and/or the TTS module 314. Additionally or alternatively, in some examples the server(s) 120 may not include the wakeword detection module 220.

The device 110/server(s) 120 further includes a program module 1824, which may comprise processor-executable instructions stored in storage 1808 to be executed by controller(s)/processor(s) 1804 (e.g., software, firmware, hardware, or some combination thereof). For example, components of the program module 1824 may be part of a software application running in the foreground and/or background on the device 110/server(s) 120. The program module 1824 may control the device 110/server(s) 120 as discussed above, for example with regard to FIGS. 1, 11, 12, 13, 14, 15, 16A-16C and/or 17. Some or all of the controllers/modules of the program module 1824 may be executable instructions that may be embedded in hardware or firmware in addition to, or instead of, software. In one embodiment, the device 110/server(s) 120 may operate using an Android operating system (such as Android 4.3 Jelly Bean, Android 4.4 KitKat or the like), an Amazon operating system (such as FireOS or the like), or any other suitable operating system.

Executable computer instructions for operating the device 110/server(s) 120 and its various components may be executed by the controller(s)/processor(s) 1804, using the memory 1806 as temporary "working" storage at runtime. The executable instructions may be stored in a non-transitory manner in non-volatile memory 1806, storage 1808, or an external device. Alternatively, some or all of the executable instructions may be embedded in hardware or firmware in addition to or instead of software.

The components of the device 110/server(s) 120, as illustrated in FIGS. 18A-18B, are exemplary, and may be located a stand-alone device or may be included, in whole or in part, as a component of a larger device or system.

The concepts disclosed herein may be applied within a number of different devices and computer systems, including, for example, general-purpose computing systems, server-client computing systems, mainframe computing systems, telephone computing systems, laptop computers, cellular phones, personal digital assistants (PDAs), tablet computers, video capturing devices, video game consoles, speech processing systems, distributed computing environments, etc. Thus the modules, components and/or processes described above may be combined or rearranged without departing from the scope of the present disclosure. The functionality of any module described above may be allocated among multiple modules, or combined with a different module. As discussed above, any or all of the modules may be embodied in one or more general-purpose microprocessors, or in one or more special-purpose digital signal processors or other dedicated microprocessing hardware. One or more modules may also be embodied in software implemented by a processing unit. Further, one or more of the modules may be omitted from the processes entirely.

The above embodiments of the present disclosure are meant to be illustrative. They were chosen to explain the principles and application of the disclosure and are not intended to be exhaustive or to limit the disclosure. Many modifications and variations of the disclosed embodiments may be apparent to those of skill in the art. Persons having ordinary skill in the field of computers and/or digital imaging should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Embodiments of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk and/or other media.

Embodiments of the present disclosure may be performed in different forms of software, firmware and/or hardware. Further, the teachings of the disclosure may be performed by an application specific integrated circuit (ASIC), field programmable gate array (FPGA), or other component, for example.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Conjunctive language such as the phrase "at least one of X, Y and Z," unless specifically stated otherwise, is to be understood with the context as used in general to convey that an item, term, etc. may be either X, Y, or Z, or a combination thereof. Thus, such conjunctive language is not generally intended to imply that certain embodiments require at least one of X, at least one of Y and at least one of Z to each is present.

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method, the method comprising:
   receiving channel data that represents a plurality of terrestrial over-the-air broadcast television channels detectable by a first device associated with a user profile, the plurality of terrestrial over-the-air broadcast television channels including a first broadcast channel;
   determining, using the channel data and a program guide data source, program data including:
      a list of program titles that are broadcast on the plurality of terrestrial over-the-air broadcast television channels, and
      a list of broadcast time periods corresponding to each of the program titles;
   receiving first audio input data from a second device associated with the user profile;
   performing speech recognition on the first audio input data to determine text data;
   determining, using the user profile, that the second device is associated with the first device;
   configuring, using information included in the program data, a knowledge database associated with the user profile, wherein the knowledge database is used by a natural language understanding (NLU) component to interpret the text data;
   determining, using the text data, the NLU component, and the knowledge database, that the text data corresponds to a command to operate the first device to output a program received using the first broadcast channel; and
   sending, to the first device, an instruction to tune to the first broadcast channel and output the program.

2. The computer-implemented method of claim 1, further comprising:
   determining a channel identification associated with the first broadcast channel;
   determining a call sign associated with the first broadcast channel;
   determining a first program title of the program broadcast on the first broadcast channel;
   determining a list of actors associated with the program;
   determining a genre associated with the program; and
   configuring the knowledge database to include the channel identification, the call sign, the first program title, each actor included in the list of actors, and the genre.

3. The computer-implemented method of claim 1, wherein:
   the configuring the knowledge database further comprises assigning ranking values to words included in the program data;
   the determining that the text corresponds to the command further comprises:
      identifying, using the NLU component a text string included in the text data,
      determining, using the NLU component, that the text string is an entity,
      determining, using the NLU component, that the text string is included in the knowledge database,
      determining, using the NLU component and the knowledge database, a first ranking value corresponding to the text string,
      determining that the first ranking value exceeds a threshold, and
      determining that the text string corresponds to a title of the program.

4. The computer-implemented method of claim 1, wherein the determining that the text data corresponds to the command further comprises:
   determining that the text data includes a first word;
   identifying the first word within the program data;
   determining that the first word corresponds to a channel identification associated with the first broadcast channel;
   determining a confidence score that the text data is associated with the program, wherein the confidence score is determined based at least in part on the first word corresponding to the channel identification; and
   determining that the confidence score is above a threshold.

5. A computer-implemented method, comprising:
   receiving first data indicating a plurality of content channels accessible via a first device associated with a user profile, the plurality of content channels accessible by detecting terrestrial over-the-air broadcasts and including a content channel;
   determining, based on the first data, second data including information associated with the plurality of content channels;
   associating the second data with the user profile;
   operating a speech processing component based at least in part on the second data, wherein the speech processing component is associated with the user profile;
   receiving audio data representing an utterance;
   performing speech recognition on the audio data to determine text data;
   determining that the audio data is associated with the first device;
   performing natural language understanding, using the text data and the speech processing component, to determine that the text data corresponds to a command to operate the first device to output a first content item being broadcast on the content channel; and
   sending a message to the first device to tune to the content channel.

6. The computer-implemented method of claim 5, further comprising, based on the second data:
   determining a channel identification associated with the content channel;

39 determining a call sign associated with the content channel;
determining a title of the first content item;
determining a list of actors associated with the first content item; and
determining a genre associated with the first content item; and
updating the user profile to include the channel identification, the call sign, the title, each actor included in the list of actors, and the genre.

7. The computer-implemented method of claim 5, further comprising:
configuring an entity resolution component to recognize the information included in the second data; and
performing the natural language understanding, using the text data, the speech processing component, and the entity resolution component, to determine that the text data corresponds to the command to operate the first device to output the first content item.

8. The computer-implemented method of claim 5, further comprising:
updating the user profile to assign ranking values to words included in the second data;
identifying a text string included in the text data;
determining that the text string is an entity;
determining that the text string is included in the user profile;
determining a first ranking value corresponding to the text string;
determining that the first ranking value exceeds a threshold; and
determining that the text string corresponds to a title of the first content item.

9. The computer-implemented method of claim 5, further comprising:
receiving the audio data from the first device during a first time period;
receiving the first data from the first device during the first time period; and
sending, to the first device, the message to tune to the content channel.

10. The computer-implemented method of claim 5, further comprising:
receiving the first data from the first device;
receiving the audio data from a second device;
determining that the second device is associated with the user profile;
determining, based at least in part on the user profile, that the audio data is associated with the first device; and
sending, to the first device, the message to tune to the content channel.

11. The computer-implemented method of claim 5, wherein the performing natural language understanding further comprises:
determining, using the text data and the speech processing component, a first confidence score that the text data corresponds to the command;
determining, using the text data and the speech processing component, a second confidence score that the text data corresponds to a second command to operate the first device to output a second content item;
determining that the first confidence score is above a threshold;
determining that the second confidence score is above the threshold;

40 sending, to the first device, a second message to display a user interface listing the first content item and the second content item; and
receiving, from the first device, an indication of the first content item.

12. The computer-implemented method of claim 5, wherein the determining that the text data corresponds to the command further comprises:
determining that the text data includes a first word;
identifying the first word within the user profile;
determining that the first word is associated with the first content item;
determining a confidence score that the text data is associated with the first content item, wherein the confidence score is determined based at least in part on the first word being associated with the first content item; and
determining that the confidence score is above a threshold.

13. The computer-implemented method of claim 5, wherein:
the first data indicates a channel identification associated with the content channel; and
the second data includes at least one of:
the channel identification associated with the content channel,
a call sign associated with the content channel,
a title of the first content item,
a list of actors associated with the first content item, and
a broadcast time period associated with the first content item.

14. The computer-implemented method of claim 5, wherein the message includes a command instructing the first device to control an over-the-air television tuner to tune to the content channel.

15. The computer-implemented method of claim 5, further comprising:
configuring the speech processing component based at least in part on the second data, wherein the speech processing component is associated with the user profile.

16. The computer-implemented method of claim 5, wherein the plurality of content channels are accessible by detecting the terrestrial over-the-air broadcasts based on a signal strength.

17. A system, comprising:
at least one processor;
memory including instructions operable to be executed by the at least one processor to perform a set of actions to cause the system to:
receive first data indicating a plurality of content channels accessible via a first device associated with a user profile, the plurality of content channels accessible by detecting over-the-air broadcasts and including a content channel;
determine, based on the first data, second data including information associated with the plurality of content channels;
associate the second data with the user profile;
receive audio data representing an utterance;
perform speech recognition on the audio data to determine text data;
determine that the audio data is associated with the first device;
perform natural language understanding, using the text data and the user profile, to determine that the text data corresponds to a command to operate the first device to output a first content item being broadcast on the content channel, wherein determining that the text data corresponds to the command further comprises:
- determining that the text data includes a first word,
- identifying the first word within the user profile,
- determining that the first word is associated with the first content item,
- determining a confidence score that the text data is associated with the first content item, wherein the confidence score is determined based at least in part on the first word being associated with the first content item, and
- determining that the confidence score is above a threshold; and send a message to the first device to tune to the content channel.

18. The system of claim 17, wherein the memory further comprises instructions that, when executed by the at least one processor, further cause the system to, based on the second data:
- determine a channel identification associated with the content channel;
- determine a call sign associated with the content channel;
- determine a title of the first content item;
- determine a list of actors associated with the first content item;
- determine a genre associated with the first content item; and
- update the user profile to include the channel identification, the call sign, the title, each actor included in the list of actors, and the genre.

19. The system of claim 17, wherein the memory further comprises instructions that, when executed by the at least one processor, further cause the system to:
- configure an entity resolution component to recognize the information included in the second data; and
- perform the natural language understanding, using the text data, the user profile, and the entity resolution component, to determine that the text data corresponds to the command to operate the first device to output the first content item.

20. The system of claim 17, wherein the memory further comprises instructions that, when executed by the at least one processor, further cause the system to:
- update the user profile to assign ranking values to words included in the second data;
- identify a text string included in the text data;
- determine that the text string is an entity;
- determine that the text string is included in the user profile;
- determine a first ranking value corresponding to the text string;
- determine that the first ranking value exceeds a second threshold; and
- determine that the text string corresponds to a title of the first content item.

21. The system of claim 17, wherein the memory further comprises instructions that, when executed by the at least one processor, further cause the system to:
- receive the audio data from the first device during a first time period;
- receive the first data from the first device during the first time period; and send, to the first device, the message to tune to the content channel.

22. The system of claim 17, wherein the memory further comprises instructions that, when executed by the at least one processor, further cause the system to:
- receive the first data from the first device;
- receive the audio data from a second device;
- determine that the second device is associated with the user profile;
- determine, based at least in part on the user profile, that the audio data is associated with the first device; and
- send, to the first device, the message to tune to the content channel.

23. The system of claim 17, wherein the memory further comprises instructions that, when executed by the at least one processor, further cause the system to:
- determine, using the text data and the user profile, a second confidence score that the text data corresponds to the command;
- determine, using the text data and the user profile, a third confidence score that the text data corresponds to a second command to operate the first device to output a second content item;
- determine that the second confidence score is above a second threshold;
- determine that the third confidence score is above the second threshold;
- send, to the first device, a second message to display a user interface listing the first content item and the second content item; and
- receive, from the first device, an indication of the first content item.

24. A computer-implemented method, comprising:
- receiving, from a first device associated with a user profile, first data indicating a plurality of content channels accessible via the first device by detecting over-the-air broadcasts, the plurality of content channels including a content channel;
- receiving, from a second device, second data including information associated with a second plurality of content channels, the second plurality of content channels including the plurality of content channels;
- determining, based on the first data, third data including information associated with the plurality of content channels, wherein the third data corresponds to a portion of the second data that is associated with the plurality of content channels;
- associating the third data with the user profile;
- operating a speech processing component based at least in part on the third data, wherein the speech processing component is associated with the user profile;
- receiving audio data representing an utterance;
- performing speech recognition on the audio data to determine text data;
- determining that the audio data is associated with the first device;
- performing natural language understanding, using the text data and the speech processing component, to determine that the text data corresponds to a command to operate the first device to output a first content item being broadcast on the content channel; and
- sending a message to the first device to tune to the content channel.

* * * * *